US012232013B2

(12) United States Patent
Crabbs

(10) Patent No.: US 12,232,013 B2
(45) Date of Patent: Feb. 18, 2025

(54) ASSOCIATING SETS OF DATA CORRESPONDING TO A CLIENT DEVICE

(71) Applicant: Juniper Networks, Inc., Sunnyvale, CA (US)

(72) Inventor: Robert Crabbs, East Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 314 days.

(21) Appl. No.: 17/654,559

(22) Filed: Mar. 11, 2022

(65) Prior Publication Data

US 2023/0292218 A1 Sep. 14, 2023

(51) Int. Cl.

| | |
|---|---|
| ***H04W 40/24*** | (2009.01) |
| ***H04B 17/318*** | (2015.01) |
| ***H04L 61/2514*** | (2022.01) |
| ***H04W 24/02*** | (2009.01) |
| ***H04W 24/08*** | (2009.01) |
| *H04W 88/08* | (2009.01) |

(52) U.S. Cl.
CPC ........ *H04W 40/246* (2013.01); *H04B 17/318* (2015.01); *H04L 61/2514* (2013.01); *H04W 24/02* (2013.01); *H04W 24/08* (2013.01); *H04W 88/08* (2013.01)

(58) Field of Classification Search
CPC ... H04W 40/246; H04W 24/02; H04W 24/08; H04W 88/08; H04B 17/318; H04L 61/2514
See application file for complete search history.

(56) References Cited

U.S. PATENT DOCUMENTS 9,729,439 B2 8/2017 MeLampy et al.
9,729,682 B2 8/2017 Kumar et al.
(Continued)

FOREIGN PATENT DOCUMENTS

EP 3700133 A1 8/2020
WO 2017003780 A1 1/2017

OTHER PUBLICATIONS

Extended Search Report from counterpart European Application No. 22215176.3 dated Jul. 18, 2023, 9 pp.
(Continued)

*Primary Examiner* — Fahmida S Chowdhury
(74) *Attorney, Agent, or Firm* — Shumaker & Sieffert, P.A.

(57) ABSTRACT

A network management system includes a memory storing a set of access point (AP) data, wherein the set of AP data corresponds to a communication between a client device and an AP device. Additionally, the network management system includes processing circuitry configured to: receive the set of AP data corresponding to the client device; and receive a set of remote server data, wherein the set of remote server data comprises information corresponding to a communication between the client device and a remote server separate from the network management system. Additionally, the processing circuitry is configured to: determine an association between the set of AP data and the set of remote server data based one or more matching criteria; store data indicative of the association between the set of AP data and the set of remote server data; and perform an action based on the association.

20 Claims, 7 Drawing Sheets

702 RECEIVE A SET OF ACCESS POINT (AP) DATA CORRESPONDING TO A COMMUNICATION BETWEEN A CLIENT DEVICE AND AN AP DEVICE

704 RECEIVE A SET OF REMOTE SERVER DATA CORRESPONDING TO A COMMUNICATION BETWEEN THE CLIENT DEVICE AND A REMOTE SERVER

706 DETERMINE AN ASSOCIATION BETWEEN THE SET OF AP DATA AND THE SET OF REMOTE SERVER DATA BASED ONE OR MORE MATCHING CRITERIA

708 STORE DATA INDICATIVE OF THE ASSOCIATION BETWEEN THE SET OF AP DATA AND THE SET OF REMOTE SERVER DATA

710 PERFORM AN ACTION BASED ON THE ASSOCIATION

(56) References Cited

U.S. PATENT DOCUMENTS

| | | | |
|---|---|---|---|
| 9,762,485 | B2 | 9/2017 | Kaplan et al. |
| 9,832,082 | B2 | 11/2017 | Dade et al. |
| 9,871,748 | B2 | 1/2018 | Gosselin et al. |
| 9,985,883 | B2 | 5/2018 | MeLampy et al. |
| 10,200,264 | B2 | 2/2019 | Menon et al. |
| 10,277,506 | B2 | 4/2019 | Timmons et al. |
| 10,432,522 | B2 | 10/2019 | Kaplan et al. |
| 10,756,983 | B2 | 8/2020 | Ratkovic et al. |
| 10,862,742 | B2 | 12/2020 | Singh |
| 10,958,537 | B2 | 3/2021 | Safavi |
| 10,958,585 | B2 | 3/2021 | Safavi |
| 10,985,969 | B2 | 4/2021 | Safavi et al. |
| 10,992,543 | B1 | 4/2021 | Rachamadugu et al. |
| 11,494,255 | B2 | 11/2022 | Wang |
| 2015/0113132 | A1 | 4/2015 | Srinivas et al. |
| 2018/0091873 | A1* | 3/2018 | Navin ................... H04L 67/141 |
| 2019/0297122 | A1* | 9/2019 | Harrison ............ H04N 21/2541 |
| 2019/0356553 | A1 | 11/2019 | Mermoud et al. |
| 2019/0372857 | A1* | 12/2019 | Gandhi ............... H04L 41/0896 |
| 2020/0322826 | A1 | 10/2020 | Wangler et al. |
| 2020/0403890 | A1 | 12/2020 | McCulley et al. |
| 2021/0152990 | A1* | 5/2021 | Pajovic ................. G01S 5/0226 |
| 2021/0195443 | A1 | 6/2021 | Agarwal et al. |
| 2021/0226867 | A1* | 7/2021 | Ovadia ................. H04L 43/065 |
| 2021/0306201 | A1 | 9/2021 | Wang et al. |
| 2022/0200954 | A1* | 6/2022 | Divekar .................. H04L 45/85 |
| 2022/0386219 | A1* | 12/2022 | Akl ..................... H04W 40/246 |
| 2022/0400123 | A1* | 12/2022 | Ayoub .................... G06F 3/067 |

OTHER PUBLICATIONS

U.S. Appl. No. 17/303,222, filed May 24, 2021, naming inventors Safavi.

U.S. Appl. No. 63/261,939, filed Sep. 30, 2021, naming inventors Shah et al.

7Signal, "7Signal Launches Enhanced Wireless Monitoring Application", Aug. 24, 2020, 3 pp., Retrieved from the Internet on Feb. 28, 2023 from URL: https://www.7signal.com/news/press/7signal-launches-enhanced-wireless-monitoring-application.

7Signal, "A New IDC White Paper Quantifies the ROI of 7Signal", Jan. 5, 2021, 3 pp., Retrieved from the Internet on Feb. 28, 2023 from URL: https://www.7signal.com/news/blog/a-new-idc-white-paper-quantifies-the-roi-of-7signal-solutions.

Juniper, "Marvis Android Client", Juniper driven by Mist AI, Juniper Networks, Inc., 2 pp., Retrieved from the Internet on Sep. 1, 2021 from URL: https://www.mist.com/documentation/category/marvis-android-client/.

Juniper, "Marvis Client—Why do I need it?", Juniper Networks, Inc., 2021, 4 pp., Retrieved from the Internet on Jul. 30, 2021 from URL: https://www.mist.com/documentation/marvis-client-faq/.

Juniper, "Marvis Clients View: Why do we need a Marvis Clients Page?", Juniper driven by Mist AI, Juniper Networks, Inc., 2023, 3 pp., Retrieved from the Internet on Jan. 4, 2023 from URL: https://www.mist.com/documentation/marvis-clients-view/.

Juniper, "Zebra Wireless Insights", Juniper driven by Mist AI, Juniper Networks, Inc., 2023, 4 pp., Retrieved from the Internet on Jan. 4, 2023 from URL: https://www.mist.com/documentation/zebra-worry-free-wi-fi-wfw-integration/.

U.S. Appl. No. 17/652,787, filed Feb. 28, 2022, naming inventors Wang et al.

U.S. Appl. No. 17/935,704, filed Sep. 27, 2022, naming inventors Wang et al.

U.S. Appl. No. 17/937,347, filed Sep. 30, 2022, naming inventors Shah et al.

Response to Extended Search Report dated Jul. 18, 2023, from counterpart European Application No. 22215176.3 filed Mar. 12, 2024, 20 pp.

* cited by examiner

ASSOCIATING SETS OF DATA CORRESPONDING TO A CLIENT DEVICE

TECHNICAL FIELD

This disclosure relates to computer networks and, more specifically, to access points (APs) of computer networks.

BACKGROUND

A computer network is a collection of interconnected computing devices that can exchange data and share resources. In some examples, a source device, such as a wireless device, connects to an AP to connect to a wired computer network, such as an enterprise network, branch network, service provider network, home network, virtual private network (VPN), local area network (LAN), virtual LAN (VLAN), and the like. For example, the AP may receive application traffic from source devices and tunnel (e.g., using Generic Routing Encapsulation (GRE)) the application traffic to a gateway device of the enterprise network, which in turn sends the application traffic to the destination device, such as an application server.

A premises may include one or more wireless APs, to provide network services to one or more client devices. APs are physical, electronic devices that enable other devices to connect to a network using various networking protocols and technologies, such as local area networking protocols conforming to one or more of the IEEE 802.11 standards (i.e., "Wi-Fi"), Bluetooth/Bluetooth Low Energy (BLE), mesh networking protocols such as ZigBee or other networking technologies. Many different types of wireless client devices, such as laptop computers, smartphones, tablets, wearable devices, appliances, and Internet of Things (IoT) devices, can be configured to connect to APs.

SUMMARY

This disclosure describes techniques for associating a set of access point (AP) data corresponding to a communication between a client device and an AP and a set of remote server data corresponding to communication between the client device and a remote server. Client devices may access a local area network (LAN) by connecting to an AP. In some examples, when a client device connects to an AP, the client device may exchange data with the AP that identifies the client device within the LAN. A network management system may receive data corresponding to client devices that connect to the AP. This data may include one or more time stamps, one or more local interne protocol (IP) addresses, one or more global IP addresses, data indicating one or more service level expectation (SLE) metrics, or any combination thereof.

When the client device is connected to the AP, the client device may also communicate with a wide area network (WAN) that includes one or more remote servers. The WAN may include one or more remote servers configured to communicate with the client device upon request. For example, a client device connected to an AP may send a data request to a remote server in the WAN. The data request may comprise a hypertext transfer protocol (HTTP) request, a hypertext transfer protocol secure (HTTPS) request, or another kind of request. The data request may include browser fingerprint data corresponding to the client device such as an identity of a manufacturer of the client device, a model of the client device, an operating system executing on the client device, one or more applications executing on the client device, or any combination thereof. Additionally, or alternatively, the data request may include one or more global IP addresses corresponding to the client device. In some examples, the data request might not include at least some information that is present in the set of AP data corresponding to the connection between the client device and the AP. The remote server may perform one or more actions in response to receiving the data request. Subsequently, the remote server may output a set of remote server data that comprises data included in the data request, and data indicative of the one or more actions.

The techniques of this disclosure may provide one or more advantages. For example, a system described herein may determine that a set of AP data and a set of remote server data correspond to the same client device, even when the set of remote server data might not include some of the information present in the set of AP data. This may allow the system to store pairings of AP data and remote server data known to correspond to the same client device for further analysis. In some examples, a set of remote server data may comprise a request from a client device to perform a network speed test, and the results from a speed test resulting from the request. By storing an association between the set of remote server data corresponding to the client device and a set of AP data corresponding to the same client device, the network management system may be configured to analyze the AP data and the remote server data more effectively as compared with systems that do not store associations between AP data and remote server data. For example, when the remote server data includes speed test results, the system may train a model for predicting speed test results based on the AP data and/or predicting AP data based on speed test results.

In one example, a network management system includes a memory storing a set of access point (AP) data corresponding to a client device of a plurality of client devices, wherein the set of AP data corresponds to a communication between the client device and an AP device. Additionally, the network management system includes processing circuitry configured to: receive the set of AP data corresponding to the client device; and receive a set of remote server data, wherein the set of remote server data comprises information corresponding to a communication between the client device and a remote server separate from the network management system. Additionally, the processing circuitry is configured to: determine an association between the set of AP data and the set of remote server data based one or more matching criteria; store data indicative of the association between the set of AP data and the set of remote server data, wherein the one or more matching criteria indicate that the set of AP data and the set of remote server data correspond to the same client device of the plurality of client devices, and wherein the set of AP data comprises at least some information inaccessible to the external server communicating with the client device; and perform an action based on the association.

In another example, a method includes storing, by a memory of a network management system, a set of access point (AP) data corresponding to a client device of a plurality of client devices, wherein the set of AP data corresponds to a communication between the client device and an AP device; receiving, by processing circuitry of the network management system, the set of AP data corresponding to the client device; and receiving, by the processing circuitry, a set of remote server data, wherein the set of remote server data comprises information corresponding to a communication between the client device and a remote server separate from the network management system. Additionally, the method includes determining, by the processing circuitry, an association between the set of AP data and the set of remote server data based one or more matching criteria; storing, by the processing circuitry, data indicative of the association between the set of AP data and the set of remote server data, wherein the one or more matching criteria indicate that the set of AP data and the set of remote server data correspond to the same client device of the plurality of client devices, and wherein the set of AP data comprises at least some information inaccessible to the external server communicating with the client device; and performing, by the processing circuitry, an action based on the association.

In another example, a non-transitory computer-readable medium includes instructions for causing one or more processors to: store a set of access point (AP) data corresponding to a client device of a plurality of client devices, wherein the set of AP data corresponds to a communication between the client device and an AP device; receive the set of AP data corresponding to the client device; receive a set of remote server data, wherein the set of remote server data comprises information corresponding to a communication between the client device and a remote server; determine an association between the set of AP data and the set of remote server data based one or more matching criteria; store data indicative of the association between the set of AP data and the set of remote server data, wherein the one or more matching criteria indicate that the set of AP data and the set of remote server data correspond to the same client device of the plurality of client devices, and wherein the set of AP data comprises at least some information inaccessible to the external server communicating with the client device; and perform an action based on the association.

The details of one or more examples are set forth in the accompanying drawings and the description below. Other features, objects, and advantages will be apparent from the description and drawings, and from the claims.

DETAILED DESCRIPTION

Figure 1:
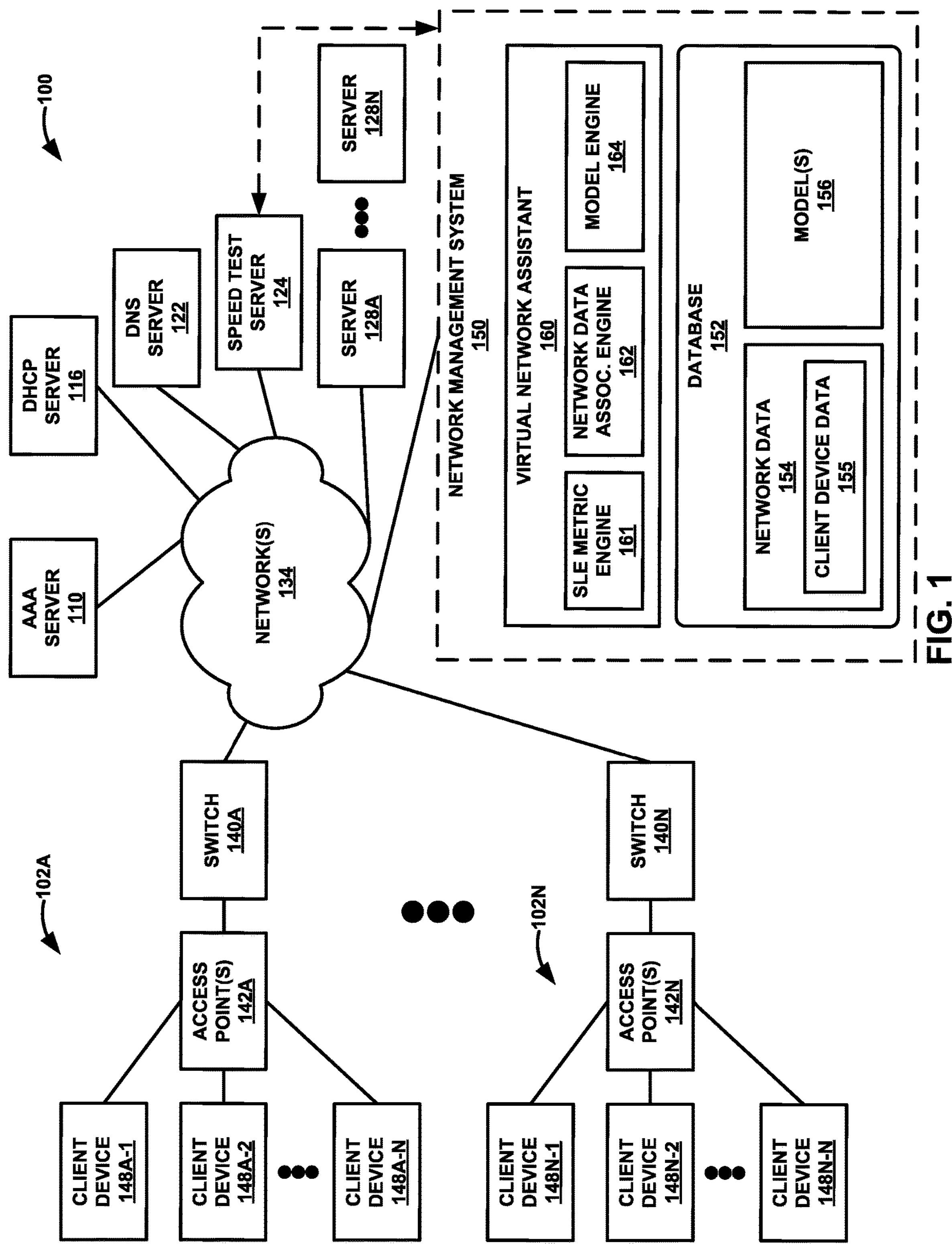
FIG. 1 is a diagram of an example network system configured to monitor a plurality of sites, in accordance with one or more techniques of this disclosure.

FIG. 1 is a diagram of an example network system 100 configured to monitor a plurality of sites 102A-102N, in accordance with one or more techniques of this disclosure. Example network system 100 includes a plurality sites 102A-102N at which a network service provider manages one or more wireless networks. In some examples, each site 102A-102N includes a single wireless network. In some examples, each site 102A-102N may include multiple wireless networks, and the disclosure is not limited in this respect.

Each site 102A-102N includes one or more access points (APs) of APs 142A-142N, referred to generally as APs 142. For example, site 102A includes AP(s) 142A. Similarly, site 102N includes AP(s) 142N. Each of APs 142 may be any type of wireless AP, including, but not limited to, a commercial or enterprise AP, a router, or any other device capable of providing wireless network access. In some examples, a site may include more than one AP.

Each site 102A-102N also includes a plurality of client devices 148, representing various wireless-enabled devices within each site. For example, a plurality of client devices 148A-1 through 148A-N are currently located at site 102A. Similarly, a plurality of client devices 148N-1 through 148N-N are currently located at site 102N. Each client device 148 may be any type of wireless client device, including, but not limited to, a mobile device such as a smart phone, tablet or laptop computer, a personal digital assistant (PDA), a wireless terminal, a smart watch, smart ring or other wearable device. Client devices 148 may also include interne of things (IoT) client devices such as printers, security devices, environmental sensors, or any other device configured to communicate over one or more wireless networks and/or one or more wired networks.

In some examples, each site 102A-102N comprises a local area network (LAN) that interconnects one or more devices within the site. For example, client devices 148A-1 through 148A-N are connected to AP(s) 142A, and AP(s) 142A are connected to switch 140A within site 102A such that client devices 148A-1 through 148A-N, AP(s) 142A, and switch 140A form a LAN.

Example network system 100 also includes various networking components for providing networking services within the wired network including, as examples, an Authentication, Authorization and Accounting (AAA) server 110 for authenticating users and/or client devices 148, a Dynamic Host Configuration Protocol (DHCP) server 116 for dynamically assigning network addresses (e.g., IP addresses) to client devices 148 upon authentication, a Domain Name System (DNS) server 122 for resolving domain names into network addresses, a speed test server 124 for determining one or more network speeds corresponding to sites 102, a plurality of servers 128 (e.g., web servers, databases servers, file servers and the like), and a network management system (NMS) 150. As shown in FIG. 1, the various devices and systems of network 100 are coupled together via one or more network(s) 134, e.g., the Internet and/or an enterprise intranet. Each one of the servers 110, 116, 122, 124 and/or 128, APs 142, client devices 148, NMS 150, and any other servers or devices attached to or forming part of network system 100 may include a network data engine for connecting network data associated with a client device.

A wide area network (WAN) may interconnect one or more devices spread across a large geographic area. For example, a WAN may interconnect sites 102A-102N, servers 110, 116, 122, 124 and/or 128, and NMS 150. This means that a client device, such as client device 148A-1 may be connected within both of a LAN at site 102A and a WAN that includes NMS 150. In some examples, when a client device connects to AP(s) 142A, AP(s) 142A may generate data that identifies the client device 148A-1 within the LAN at site 102A. This data may be referred to herein as "access point data." Access point data may include one or more local internet protocol (IP) addresses such as a media access control (MAC) address and/or a LAN IP address. These one or more local IP addresses may identify the client device 148A-1 as being separate from other devices within the LAN at site 102A. For example, the one or more local IP addresses may identify client device 148A-1 as being separate from client devices 148A-2 through 148A-N, and the one or more local IP addresses may identify client device 148A-1 as being separate from access point(s) 142A.

Access point data may additionally or alternatively include data indicating one or more service level expectation (SLE) metrics, sometimes referred to herein as "SLE metric data." SLE metrics represent parameters that indicate a performance of a connection between client device 148A-1 and access point(s) 142A. In some examples, SLE metrics include a time to connect metric, a throughput metric, a coverage metric, a capacity metric, a roaming metric, a successful connects metric, and an AP health metric. The time to connect metric may represent an amount of time that it takes for client device 148A-1 to connect to the internet via access point(s) 142A, measured from the time that a first packet travels from client device 148A-1 to access point(s) 142. The throughput metric indicates an amount of throughput available to the client device when the client device is connected to a respective access point. The coverage metric represents an amount of time that a received signal strength indicator (RSSI) corresponding to the client device is below an RSSI threshold. The capacity metric represents an amount of time that a client device experiences capacity that is below an SLE capacity threshold. The roaming metric represents a percentage of successful roams between two access points within a LAN. The successful connects metric represents a percentage of successful authorization, association, DHCP, address resolution protocol (ARP), and domain name system (DNS) attempts during an initial connection between the client device and the access point. In some examples, SLE data may include RSSI data, signal-to-noise ratio (SNR) data, Wi-Fi protocol data, ping data, and/or any other data that indicates one or more SLE metrics.

In some examples, access point data may include one or more global IP addresses corresponding to client device 148A-1. In some examples, the one or more global IP addresses may identify client device 148A-1 as being part of a LAN at site 102A without identifying client device 148A-1 as being separate from other divides within the LAN at site 102A. For example, the same one or more global IP addresses may be associated with each of client devices 148A-1 through 148A-N, and access point(s) 142A.

Speed test server 124 may, in some examples, have access to a set of remote server data corresponding to client device 148A-1. The remote server data may include browser fingerprint data, one or more global IP addresses, one or more time stamps, and speed test results data. The one or more global IP addresses and/or the browser fingerprint data may, in some cases, include some of the same data that is present in the one or more global IP addresses and/or the browser fingerprint data that is part of the access point data. This means that a system (e.g., NMS 150) may be configured to associate the set of AP data with the remote server data based on comparing the one or more global IP addresses and/or the browser fingerprint data present in both sets of data.

In some examples, at least some of the set of access point data available to AP(s) 142A might not be accessible to one or more remote devices connected to the WAN. For example, speed test server 124 might not have access to the media access control (MAC) address and/or the LAN IP address corresponding to client device 148A-1, and speed test server 124 might not have access to the SLE data (e.g., RSSI data and SNR data) corresponding to client device 148A-1. Additionally, or alternatively, at least some of the remote server data available to speed test server 124 might not be present in the set of access point data available to AP(s) 142A. For example, speed test server 124 may generate speed test results in response to receiving a data request from client device 148A-1, and these speed test results might be part of the remote server data without being included in the access point data. It may be beneficial to associate access point data corresponding to client device 148A-1 with remote server data corresponding to speed test server 124 so that the speed test results are associated with the SLE metric data. This association between the speed test results and the SLE metric data may allow processing circuitry to train a model that predicts speed test results based on SLE metric data and/or predicts SLE metric data based on speed test results.

In the example of FIG. 1, NMS 150 is a cloud-based computing platform that manages LANs at one or more of sites 102A-102N. As further described herein, NMS 150 provides an integrated suite of wireless network management tools and implements various techniques of the disclosure. For example, NMS 150 may streamline network operations based on network data and improve user experiences across network system 100 as compared with systems that do not analyze network data in order to manage a network. NMS 150 may be configured to detect one or more anomalies within SLE metrics and determine the root cause of these anomalies. NMS 150 may analyze network data including access point data and remote server data in order to determine a scope of a problem or anomaly within network device system 150. In some examples, NMS 150 may execute one or more models (e.g., machine learning (ML) models, artificial intelligence (AI) models, linear regression models, non-linear regression models, or any combination thereof) in order to analyze network data. For example, these models may output predictions of future network performance and/or output one or more suggestions for improving network performance.

In some examples, NMS 150 may collect network data to monitor wireless network behavior and measure one or more aspects of wireless network performance sites 102. The network data may be collected from, for example, one or more of client devices 148 and/or one or more APs 142 associated with a wireless network. One or more SLE metrics determined based on the collected network data can be used to measure various aspects of wireless network performance. SLE metrics seek to measure and understand network performance from the viewpoint of the end user experience on the network. One example SLE metric is a coverage metric, which tracks the number of user minutes that a client device's RSSI as measured by an AP with which the client is associated is below a configurable threshold. Another example SLE metric is a roaming metric, which tracks a client's percentage of successful roams between two APs that are within prescribed latency (e.g., time-based) threshold. Other example SLE metrics may include time to connect, throughput, successful connects, capacity, AP health, and/or any other metric that may be indicative of one or more aspects of wireless network performance. The SLE metrics may also include parameters such as an RSSI of a received wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

NMS 150 includes a database 152 that is configured to store network data corresponding to sites 102 or any other parts of network system 100. For example, database 152 stores network data 154. Network data 154 includes all data received by NMS 150 relating to parts of network system 100. For example, network data 154 may be indicative of one or more aspects of wireless network performance. Network data 154 may take the form of data extracted from messages, counters and statistics, for example. The network data may be collected and/or measured by one or more client devices 148 and/or one or more APs 142 in a wireless network. Some of the network data 154 may be collected and/or measured by other devices in the network system 100. In some examples, network data 154 may include data corresponding one or more devices within network system 100. For example, client device data 155 may include receive access point data corresponding to client devices 148. This access point data may include one or more local internet protocol (IP) addresses, RSSI data, SNR data, or any combination thereof. Additionally, or alternatively, client device data 155 may include remote server data corresponding to client devices 148. This remote server data may include, for one or more of client devices 148, an identity of a manufacturer of a client device, a model of the client device, an identity of an operating system executing on the client device, a global IP address corresponding to the user IP address, one or more applications executing on the client device, one or more other device-specific facts, or any combination thereof.

Database 152 may store one or more model(s) 156. Model(s) 156 may include machine learning (ML) models, artificial intelligence (AI) models, linear regression models, non-linear regression models, or any combination thereof. In some examples, NMS 150 may execute model(s) 156 in order to analyze network data. In some examples, NMS 150 may train one or more of model(s) 156 based on training data that includes a portion of network data 154 or all of network data 154.

NMS 150 monitors network data associated with LANs at each site 102A-102N, respectively, and manages network resources, such as APs 142 at each site, to deliver a high-quality wireless network experience to end users, IoT devices and clients at the site. The network data 154 may be stored in a database associated with NMS 150, such as database 152. In general, NMS 150 may provide a cloud-based platform for network data acquisition, monitoring, activity logging, reporting, predictive analytics, network anomaly identification, and alert generation.

NMS 150 may include a virtual network assistant (VNA) 160 that analyzes network data received from one or more client devices 148 and/or one or more APs 142 in a wireless network. For example, VNA 160 may analyze access point data and remote server data corresponding to one or more of client devices 148. VNA 160 may output recommendations and/or results in response to receiving access point data and remote server data corresponding to the one or more of client devices 148. In some examples, these recommendations and/or results may include one or more predictions of network speed for client devices 148. VNA 160 may generate the one or more models 156 (e.g., machine learning (ML) models, artificial intelligence (AI) models, linear regression models, non-linear regression models, or any combination thereof) that are configured to process network data received by NMS 150.

In some examples, VNA 160 may provide real-time insights and simplified troubleshooting for IT operations, and automatically takes remedial action or provides recommendations to proactively address wireless network issues. VNA 160 may, for example, include a network data processing platform configured to process hundreds or thousands of concurrent streams of network data from client devices 148, sensors and/or agents associated with APs 142 and/or nodes within network 134. For example, VNA 160 of NMS 150 may include a network performance engine that automatically determines one or more SLE metrics for each client device 148 in a wireless network. VNA 160 may also include an underlying analytics and network error identification engine and alerting system. VNA 160 may further provide real-time alerting and reporting to notify administrators or IT personnel of any predicted events, anomalies, trends, and may perform root cause analysis and automated or assisted error remediation.

VNA 160 includes an SLE metric engine 161. NMS 150 may execute SLE metric engine 161 to determine one or more SLE metrics for each client device 148 associated with a wireless network at a site 102. One or more of the SLE metrics may further be aggregated to each AP 148 at a site to gain insight into a contribution of each AP 148 to wireless network performance at the site 102. The SLE metrics track whether the service level for each particular SLE metric meets the configured threshold value(s). In some examples, each SLE metric may further include one or more classifiers. If a metric does not meet the configured SLE threshold value for the site, the failure may be attributed to one of the classifiers to further understand how and/or why the failure occurred.

VNA 160 includes network data association engine 162, sometimes referred to herein as "association engine 162." Association engine 162 may be configured to associate sets of access point data and remote server data corresponding to one or more of client devices 148. As described herein, "access point data" corresponding to a client device may identify the client device individually within the LAN as being separate from other devices within the LAN. Access point data may additionally or alternatively include data corresponding to a performance of the LAN with respect to the network device. For example, access point data may include data that indicates a strength or a data transmission speed between the client device and an AP within the LAN. As described herein, "remote server data" corresponding to a client device may include facts corresponding to the client device. But the remote server data might not include LAN-specific facts, such as one or more IP addresses that distinguish the client device from other client devices within the LAN and/or data corresponding to a connection between the client device and an AP of the LAN. Remote server data may correspond to one or more requests that a client device sends to a device outside of the LAN. For example, when a client device sends a data request to access a web address, the client device may send remote server data to a remote server without sending access point data that is known to the AP. The remote server may perform one or more actions (e.g., generate and/or transmit data) based on receiving the request. It may be beneficial for network data association engine 162 to combine access point data corresponding to the connection of a client device to the AP with remote server data corresponding to communication between the client device and the remote server.

In some examples, combining access point data and remote server data may include identifying that the access point data and the remote server data correspond to the same client device. Although access point data and remote server data might not include all of the same device identifiers, access point data and remote server data may overlap in some areas. For example, a set of AP data and a set of remote server data might both include a browser fingerprint including a set of device-specific facts. These device-specific facts may include an identity of a manufacturer of the client device, a model of the client device, an operating system executing on the client device, or any combination thereof. So even though the set of remote server data might not include one or more IP addresses that distinguish the client device from other devices within the LAN, association engine 162 may be configured to combine the set of remote server data with the set of AP data based on the device-specific facts that are common to both sets of data. Combining the set of remote server data with the set of AP data may improve an ability of VNA 160 to analyze the data as compared with systems that do not combine access point data with remote server data. For example, combining the set of AP data with the set of remote server data may associate data corresponding to the communication between the client device and the remote server with data corresponding to the connection between the client device and the AP. This association may allow VNA 160 to analyze the data corresponding to the communication between the client device and the remote server while distinguishing the client device from other devices within the LAN. Since the remote server data might not necessarily distinguish the client device from other devices within the LAN, associating the remote server data with the access point data increases an ability of the VNA 160 to analyze network performance.

In some examples, client device 148A-1 may be associated with a set of AP data that is available and known to AP(s) 142A. This access point data may include one or more IP addresses such as a MAC address and/or a LAN IP address. Access point data may additionally or alternatively include RSSI data, SNR data, and other data that indicates a performance of the LAN in relation to the client device 148A-1. In this way, access point data may include data (e.g., IP address(es)) that identifies client device 148A-1 within the LAN at site 102A as being separate from client devices 148A-2 through 148A-N, and the access point data may include data corresponding to a performance of the LAN with respect to client device 148A-1. For example, RSSI data may indicate a strength of a connection between client device 148A-1 and one or more of AP(s) 142A. That is, RSSI data may indicate a power present in a received signal. A higher power indicates a stronger connection, and a lower power indicates a weaker connection. AP(s) 142A may transmit this access point data to NMS 150 for storage by database 152 and analysis by VNA 160. This means that NMS 150 is privy to the access point data that differentiates client device 148A-1 within the LAN at site 102A.

Client device 148A-1 may be configured to interact with one or more remote devices (e.g., AAA server 110, DHCP serve 116, DNS server 122, speed test server 124, servers 128, or any combination thereof) in network device system 100 outside of NMS 150. These remote servers 110, 116, 122, 124, 128 may be located within a WAN that also includes sites 102 and network management system 150. But remote servers 110, 116, 122, 124, 128 might not be part of LANs that are specific to sites 102. This means that when a client device (e.g., client device 148A-1) communicates with one of remote servers 110, 116, 122, 124, 128, the remote server might not have access to data that differentiates the client device 148A-1 from other devices within the LAN at site 102A. The remote server might have access to data that differentiates the LAN at site 102A from one or more other LANs (e.g., a LAN at site 102N), but the remote server might lack data that specifically identifies client device 148A-1 relative to other devices within site 102A. Based on communicating with the client device, a remote server might have access to one or more device-specific facts that indicate one or more characteristics of the client device (e.g., an identity of a manufacturer of the client device, a model of the client device, an operating system executing on the client device), but these one or more characteristics might not give information corresponding to a relationship between the client device and other devices within the LAN.

In some examples, client device 148A-1 may send a data request to speed test server 124, the data request comprising a request to perform a network speed test. The data request may comprise a hypertext transfer protocol (HTTP) request, a hypertext transfer protocol secure (HTTPS) request, or another kind of request. For example, the data request may comprise a user entry of a uniform resource locator (URL) at the client device 148A-1 which causes the client device 148A-1 to send a data request to speed test server 124 via AP 124A, switch 140A, and network(s) 134. The data request may include remote server data corresponding to the client device such as an identity of a manufacturer of the client device, a model of the client device, an operating system executing on the client device, a global IP address corresponding to the user IP address, one or more applications executing on the client device, or any combination thereof. But in some examples, the remote server data might not include at least some information that is present in the access point data corresponding to the connection between the client device and the AP.

Based on receiving the data request, speed test server 124 may perform one or more actions. For example, speed test server 124 may perform a network speed test to determine a network speed corresponding to client device 148A-1. In some examples, a network speed test may indicate a rate at which client device 148A-1 sends and/or receives data from one or more remote devices within the WAN. In any case, speed test server 124 may generate one or more speed test results corresponding to client device 148A-1. These speed test results are associated with a set of remote server data corresponding to the client device 148A-1. In some examples, speed test server 124 sends the speed test results back to client device 148A-1 via network(s) 134, switch 140A, and AP(s) 142A. Speed test server 124 may additionally or alternatively send the set of remote server data including the speed test results directly to network management system 150, but this is not required. In some examples, network management system 150 may receive the set of remote server data including the speed test results from site 102A in response to speed test server 124 sending the set of remote server data including the speed test results to site 102A after performing the speed tests.

It may be beneficial for association engine 162 to associate the set of remote server data including the speed test results with a set of AP data corresponding to a connection between client device 148A-1 and AP(s) 142A. Associating the set of AP data with the set of remote server data may associate the speed test results generated by speed test server 124 with the access point data corresponding to client device 148A-1. This allows the NMS 150 to analyze the speed test data based on the set of AP data that identifies client device 148-1 in relation to other devices within the LAN at site 102A. Systems that do not combine access point data with remote server data might not be configured to analyze the speed test results for each client device at a site, because remote server data may lack information that differentiates client devices within a LAN. By combining the set of AP data corresponding to client device 148A-1 with the set of remote server data corresponding to client device 148A-1, the NMS 150 may improve an ability to analyze speed test results for individual client devices as compared with systems that do not combine remote server data and access point data.

Although FIG. 1 illustrates VNA 160 as including network data association engine 162, this disclosure is not limited to NMS 150 combining remote server data and access point data. In some examples, an AP (e.g., AP(s) 142A) may combine remote server data and access point data corresponding to one or more client devices and send combined sets of data to NMS 150. For example, AP(s) 142A may combine a set of AP data corresponding to client device 148A-1 with a set of remote server data corresponding to client device 148A-1 that includes speed test results received from speed test server 124. After combining the set of AP data with the set of remote server data, AP(s) 142A may send the resulting set of combined data to NMS 150 for storage and analysis.

NMS 150 may include model engine 164. Model engine 164 is configured to create, generate, and/or train model(s) 156 stored by database 152. In some examples, model engine 164 may be configured to generate one or more models based on stored combinations of access point data and remote server data. For example, model engine 164 may be configured to identify a set of training data stored in database 152 that includes a set of combinations of access point data and remote server data. Model engine 164 may train a machine learning model based on the set of training data. VNA 160 may be configured to execute the machine learning model in order to generate one or more outputs based on an incoming combination of access point data and remote server data.

According to one or more techniques disclosed herein, NMS 150 and/or other devices may collect Wi-Fi-related data and/or SLE-related data. This data may include sets of data corresponding to a communication of a client device 148 with a LAN and/or sets of data corresponding to a communication of a client device 148 with a WAN. A network data association engine executing on NMS 150 and/or another device (e.g., one or more of APs 142) may consolidate the LAN information and the WAN information to create a holistic view of how client devices 148 with network system 100. Wi-fi capable devices (e.g., client devices 148, APs 142, switches 140, IoT devices, or any combination thereof) may collect one or more parameters that indicate SLE metrics such as connect time parameters, throughput parameters, coverage parameters, capacity parameters, roaming parameters, and AP availability parameters. Parameters that are collected by the Wi-Fi devices may indicate one or more local IP addresses which are not visible to WAN entities outside of sites 102. In some examples, the parameters indicating SLE metrics are collected by the client devices and by an AP with which the client devices are associated. In some examples, the parameters indicating the SLE metrics may be identified by a local LAN IP address that is available to devices within the LAN.

Although most client devices of client devices 148 are configured to measure an amount of the data they are able to send and/or receive, most client devices might not be able to assess an available throughput that is available at a given time. Speed test server 124 may be configured to measure an amount of bandwidth available to one or more of client devices 148 at any given time. Speed test server 124 determines an amount of bandwidth available to a client device by exchanging packets with the client device. Speed test server 124 may send a determined amount of bandwidth to the respective client device and/or NMS 150. Since speed test server 124 is located outside of sites 102, speed test server 124 may identify a client device of client devices 148 that it is communicating with by a global IP address and/or other information included in a data request sent by the respective client device. The global IP address may be different than one or more local IP addresses that are known to the respective AP of APs 142 that is connected to the client device.

Access point data, including parameters indicating SLE metrics, may identify clients using one or more local identification numbers and/or local IP addresses, whereas the available bandwidth measured by the speed test server 124 identifies the client device 148s by their respective global IP addresses. Since remote server data and access point data include different means (local IP and global IP) to tag information, it may be beneficial to combine access point data and remote server data so that it is possible to examine the data together. This way, NMS 150 may identify one or more SLE improvements based the combined access point data and remote server data. Combining the access point data with the remote server data may facilitate a holistic picture of the underlying dependencies between the various SLE parameters and the resulting SLE. For example, a client device may have the opportunity to associate with two APs. The RSSI to the first AP may be greater than the RSSI to the second AP, however the second AP has a greater available bandwidth than the first AP. The system may determine which AP the client device should connect to based on the combined LAN and remote server data.

Figure 2:
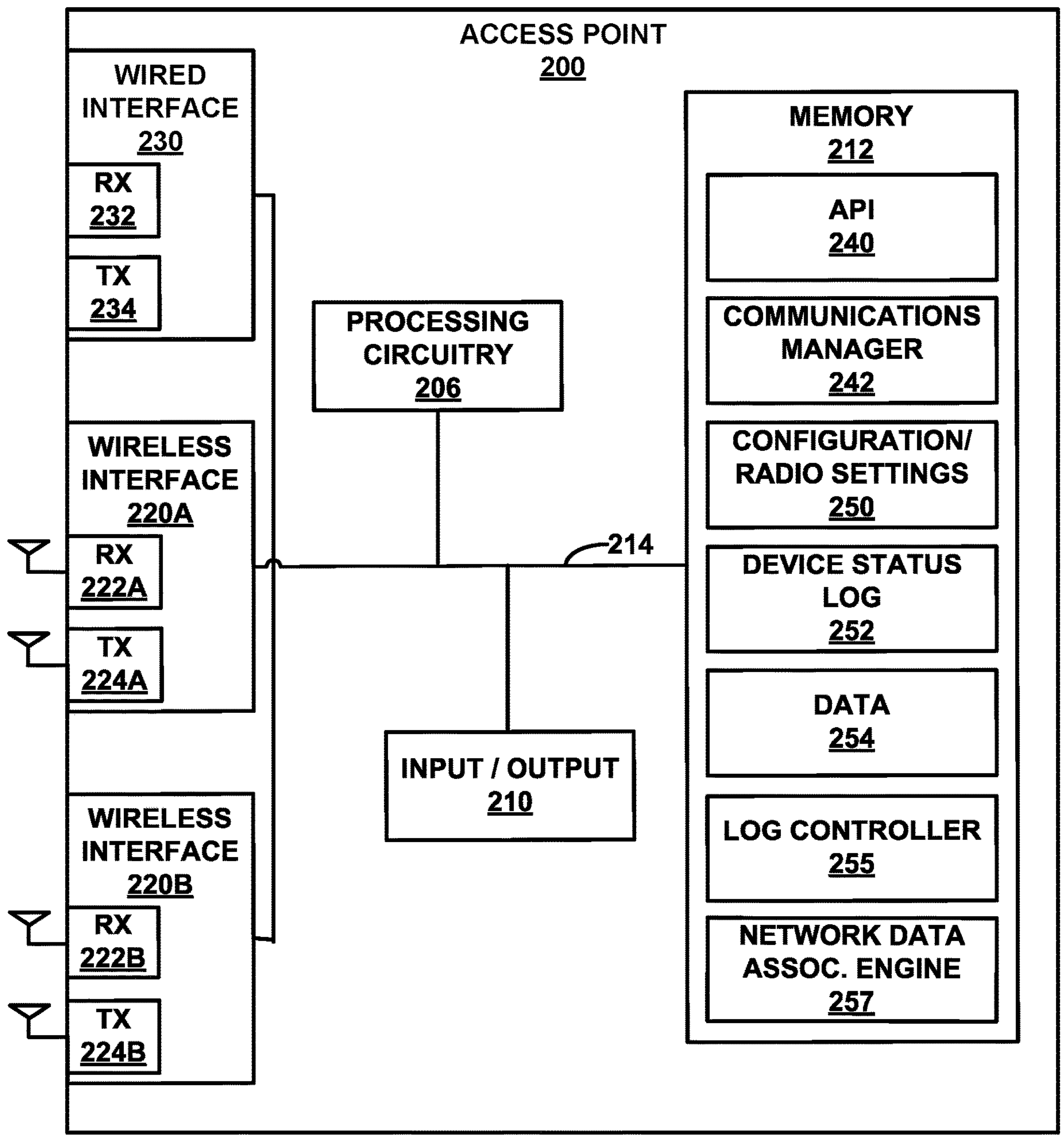
FIG. 2 is a block diagram illustrating an example access point (AP), in accordance with one or more techniques of the disclosure.

FIG. 2 is a block diagram illustrating an example AP 200, in accordance with one or more techniques of the disclosure. Example AP 200 shown in FIG. 2 may be used to implement any of APs 142 as shown and described herein with respect to FIG. 1. AP 200 may comprise, for example, a Wi-Fi, Bluetooth and/or Bluetooth Low Energy (BLE) base station or any other type of wireless AP.

In the example of FIG. 2, AP 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, AP 200 to network(s) 134 of FIG. 1. First and second wireless interfaces 220A and 220B represent wireless network interfaces and include receivers 222A and 222B, respectively, each including a receive antenna via which AP 200 may receive wireless signals from wireless communications devices, such as client devices 148 of FIG. 1. First and second wireless interfaces 220A and 220B further include transmitters 224A and 224B, respectively, each including transmit antennas via which AP 200 may transmit wireless signals to wireless communications devices, such as client devices 148 of FIG. 1. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of AP 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes network data, e.g., a list of network parameters and/or network events, specific to AP 200 and/or client devices currently or previously associated with AP 200. The network data may include, for example, any network parameter and/or network data indicative of one or more aspects of performance of the wireless network or of the AP 200 itself. In some examples, the network data may include a plurality of states measured periodically as time series data. The network data may be measured by the client devices 148 and transmitted to AP 200, may be measured by AP 200 itself or by any other device associated with the wireless network and transmitted to AP 200.

Network data stored in data storage 254 may include, for example, AP events and/or client device events. In some examples, the network events are classified as positive network events, neutral network events, and/or negative network events. The network events may include, for example, memory status, reboot events, crash events, Ethernet port status, upgrade failure events, firmware upgrade events, configuration changes, authentication events, DNS events, DHCP events, one or more types of roaming events, etc., as well as a time and date stamp for each event. Log controller 255 determines a logging level for the device based on instructions from NMS 150. Data 254 may store any data used and/or generated by AP 200, including data collected from client devices 148, such as data used to calculate one or more SLE metrics, that is transmitted by AP 200 for cloud-based management of wireless networks by NMS 150. For example, a client device 148 that executes a roaming event may measure or collect data concerning the number of available roaming options and/or the types of roaming options at the time of the roaming event, a first RSSI of a first wireless signal received from a first AP associated with the roaming event (e.g., the current AP or AP that was disassociated from) and a second RSSI of a second wireless signal received from a second AP associated with the roaming event (e.g., the target AP or AP that was re-associated to).

Additionally, or alternatively, data stored in data storage 254 may include one or more sets of access point data one or more sets of remote server data, or any combination thereof. The one or more sets of access point data may include one or more IP addresses such as MAC addresses and/or LAN IP addresses. access point data may additionally or alternatively include RSSI data, SNR data, other data corresponding to the client device, or any combination thereof. In some examples, each set of AP data of the one or more sets of access point data corresponds to a client device of a set of client devices connected to the AP 200. In some examples, AP 200 generates a new set of AP data corresponding to each client device of the one or more client devices regularly according to a time period (e.g., once every minute or once every hour) and saves the set of AP data to the memory 212. In some examples, each set of remote server data of the one or more sets of remote server data corresponds to a client device of a set of client devices connected to the AP 200. Each set of remote server data of the one or more sets of remote server data may correspond to a communication between a client device connected to the AP 200 and a remote server. A set of remote server data may include, for a client device connected to AP 200, an identity of a manufacturer of the client device, a model of the client device, an identity of an operating system executing on the client device, a global IP address corresponding to the user IP address, one or more applications executing on the client device, one or more other device-specific facts, or any combination thereof.

Based on the roaming event data in device status log 252 received from AP 200, a network management system (such as NMS 150 of FIG. 1) may identify each roaming event in a wireless network and may further determine when each roaming event occurred, the type of each roaming event, the roaming latency associated with each roaming event, and one or more roaming quality assessments for each roaming event. The roaming quality assessments may include a current RSSI upon completion of the roaming event, an RSSI delta associated with each roaming event, the number of available roaming options at the time of each roaming event and/or the types of available roaming options at the time of each roaming event. NMS 150 may further determine a suboptimal roaming score and/or a sticky client score based on the roaming quality assessments.

Communications manager 242 includes program code that, when executed by processor(s) 206, allow AP 200 to communicate with client devices 148 and/or network(s) 134 via any of interface(s) 230 and/or 220A-220B. Configuration settings 250 include any device settings for AP 200 such as radio settings for each of wireless interface(s) 220A-220B. These settings may be configured manually or may be remotely monitored and/or automatically managed or configured by NMS to optimize wireless network performance on a periodic (e.g., hourly or daily) basis. Network data association engine 257 may be configured to perform one or more techniques described herein with respect to network data association engine 162 of FIG. 1.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

In some examples, rather than the NMS 150 determining the one or more roaming quality assessments, AP 200 may be configured to determine the roaming quality assessments and/or automatically execute other functionality based on the roaming quality assessments.

Figure 3:
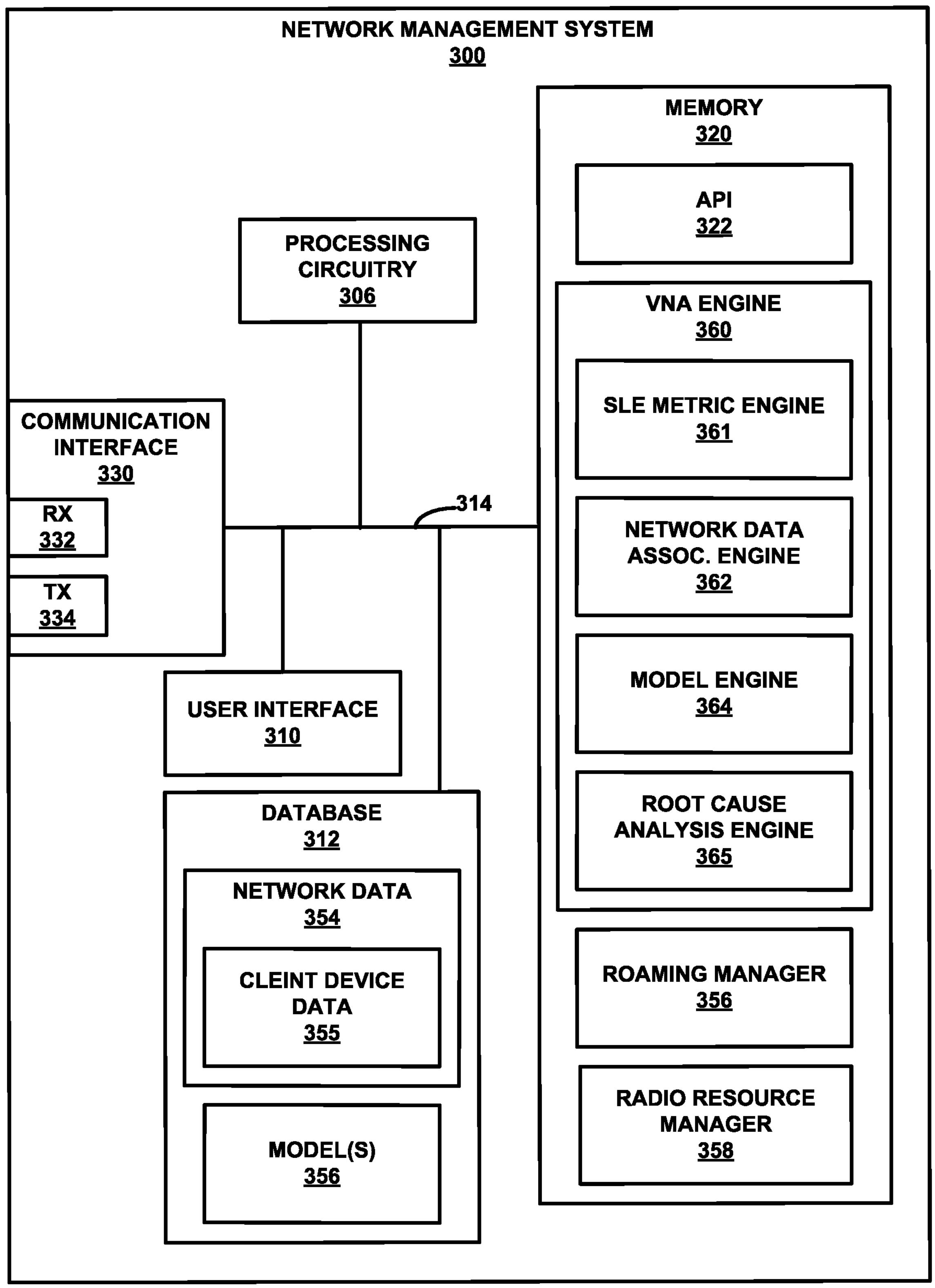
FIG. 3 is a block diagram illustrating an example network management system (NMS) configured to monitor and/or control one or more wireless networks, in accordance with one or more techniques of the disclosure.

FIG. 3 is a block diagram illustrating an example network management system (NMS) 300 configured to monitor and/or control one or more wireless networks, in accordance with one or more techniques of the disclosure. NMS 300 may be an example of NMS 150 in FIG. 1. In such examples, NMS 300 is responsible for monitoring and management of one or more wireless networks at sites 102A-102N, respectively. In some examples, NMS 300 receives network data measured by network devices such as APs 200 and/or collected by APs 200 from client devices 148, such as network data used to determine one or more roaming quality assessments and analyzes this data for cloud-based management of wireless networks at sites 102. In some examples, NMS 300 may be part of another server shown in FIG. 1 or a part of any other server.

NMS 300 includes a communications interface 330, processing circuitry 306, a user interface 310, a memory 320, and a database 312. The various elements are coupled together via a bus 314 over which the various elements may exchange data and information.

Processing circuitry 306 may include fixed function circuitry and/or programmable processing circuitry. Processing circuitry 306 may include any one or more of a microprocessor, a controller, a digital signal processor (DSP), an application specific integrated circuit (ASIC), a field-programmable gate array (FPGA), or equivalent discrete or analog logic circuitry. In some examples, processing circuitry 306 may include multiple components, such as any combination of one or more microprocessors, one or more controllers, one or more DSPs, one or more ASICs, or one or more FPGAs, as well as other discrete or integrated logic circuitry. The functions attributed to processing circuitry 306 herein may be embodied as software, firmware, hardware or any combination thereof.

Processing circuitry 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the processing circuitry 306 to perform the techniques described herein.

Communications interface 330 may include, for example, an Ethernet interface. Communications interface 330 couples NMS 300 to a network and/or the Internet, such as any of network(s) 134 as shown in FIG. 1, and/or any local area networks. Communications interface 330 includes a receiver 332 and a transmitter 334 by which NMS 300 receives/transmits data and information to/from any of APs 142, servers 110, 116, 122, 124 128 and/or any other devices or systems forming part of network 100 such as shown in FIG. 1. The data and information received by NMS 300 may include, for example, network data and/or event log data received from APs 200 used by NMS 300 to remotely monitor and/or control the performance of wireless networks at sites 102. NMS may further transmit data via communications interface 330 to any of network devices such as APs 142 at any of sites 102 to remotely manage wireless networks.

Memory 320 may be configured to store information within NMS 300 during operation. Memory 320 may include a computer-readable storage medium or computer-readable storage device. In some examples, memory 320 includes one or more of a short-term memory or a long-term memory. Memory 320 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 320 is used to store data indicative of instructions for execution by processing circuitry 306.

In this example, memory 320 includes an API 322, a virtual network assistant (VNA) engine 360, a roaming manager 356, and a radio resource management (RRM) engine 358. VNA engine 360 includes an SLE metric engine 361, a network data association engine 362, a model engine 364, and a root cause analysis engine 365. NMS 300 may also include any other programmed modules, software engines and/or interfaces configured for remote monitoring and management of wireless networks at sites 102, including remote monitoring and management of any of APs (e.g., APs 142 of FIG. 1 and/or AP 200 of FIG. 2).

VNA engine 360 analyzes network data received from APs (e.g., APs 142 of FIG. 1 and/or AP 200 of FIG. 2), and from other network devices as well as its own data to monitor performance of wireless networks at sites 102 and/or output one or more recommendations. For example, VNA engine 360 may identify when anomalous or abnormal states are encountered in one of wireless networks at sites 102. VNA engine 360 may use root cause analysis engine 365 to identify the root cause of any anomalous or abnormal states. In some examples, root cause analysis engine 365 utilizes artificial intelligence-based techniques to help identify the root cause of any poor SLE metric(s) at one or more of wireless networks at sites 102. In addition, VNA engine 360 may automatically invoke one or more remedial actions intended to address the identified root cause(s) of one or more poor SLE metrics. Examples of remedial actions that may be automatically invoked by VNA engine 360 may include, but are not limited to adjusting or modifying the transmit power of a specific radio in a specific AP, adding SSID configuration to a specific AP, changing channels on an AP or a set of APs, or any combination thereof. The remedial actions may further include restarting a switch and/or a router, and invoking or downloading of new software to an AP, switch, or router. These remedial actions are given for example purposes only, and the disclosure is not limited in this respect. If automatic remedial actions are not available or do not adequately resolve the root cause, VNA engine 360 may proactively and automatically provide a notification including recommended remedial actions to be taken by IT personnel to address the anomalous or abnormal wireless network operation.

SLE metric engine 361 enables set up and tracking of thresholds for one or more SLE metrics for wireless networks at each site of sites 102. SLE metric engine 361 further analyzes network data (e.g., stored as network data 354) collected by APs and/or client devices associated with wireless networks, such as any of APs 142 and client devices 148 in wireless networks at each of sites 102. For example, APs 142A-1 through 142A-N collect network data from client devices 148A-1 through 148A-N currently associated with a wireless network at site 102A. This data, in addition to any network data collected by one or more APs 142A-1 through 142A-N in a wireless network at site 102A, is transmitted to NMS 300 and stored as, for example, network data 354.

NMS 300 executes SLE metric engine 361 to determine one or more SLE metrics for each client device 148 associated with a wireless network. One or more of the SLE metrics may further be aggregated to each AP at a site to gain insight into each APs contribution to wireless network performance at the site. The SLE metrics track whether the service level for each particular SLE metric meets the configured threshold value(s). In some examples, each SLE metric may further include one or more classifiers. If a metric does not meet the configured SLE threshold value for the site, the failure may be attributed to one of the classifiers to further understand how and/or why the failure occurred.

In some examples, NMS 300 executes network data association engine 362 in order to analyze network data 354. Network data 354 may include client device data 355. In some examples, client device data 355 may include sets of data corresponding to one or more client devices (e.g., client devices 148 of FIG. 1). In some examples, each set of data stored in client device data 355 may include information that indicates the respective client device corresponding to the set of data. For example, a set of data may include one or more IP addresses that identify the client device. Additionally, or alternatively, a set of data may indicate one or more characteristics of the client device such as a manufacturer of the client device, a model of the client device, an identity of an operating system executing on the client device, one or more applications executing on the client device, one or more other device-specific facts, or any combination thereof.

In some examples, the client device data 355 may include one or more sets of access point data. Each set of AP data of the one or more sets of access point data may correspond to a client device of client devices 148. A set of AP data may include one or more IP addresses that identify the client device corresponding to the set of AP data within the wireless network at the respective site. For example, the one or more IP addresses may distinguish the client device as being separate from other client devices within the same wireless network. A set of AP data may additionally or alternatively include information that indicates one or more SLE metrics corresponding to the respective client device. This information may include RSSI data, SNR data, and/or any other data that indicates characteristics of an interaction between the client device and the wireless network at the respective site. A set of AP data may additionally or alternatively include information indicative of device-specific facts other than IP addresses such as a manufacturer of the client device, a model of the client device, an identity of an operating system executing on the client device, one or more applications executing on the client device, one or more other device-specific facts, or any combination thereof. This means that a set of AP data may include information identifying the respective client device as being separate from other devices within the same LAN, information indicating one or more characteristics of an interaction between the client device and the LAN, and information indicating one or more device-specific facts for the client device.

Wireless networks may generate new sets of access point data for a client device at a predetermined rate (e.g., every second, every ten seconds, every minute, or any other rate). To monitor wireless networks at sites 102, it may be beneficial for VNA engine 360 to receive current information indicating SLE metrics at each of client devices 148. This means that client device data 355 may include a sequence of sets of access point data corresponding to a respective client device, each set of AP data corresponding to a time. This allows VNA engine 360 to detect changes in SLE metrics corresponding to a client device of client devices 148 over a period of time.

In some examples, the client device data 355 may include one or more sets of remote server data. Each set of remote server data of the one or more sets of remote server data may correspond to a client device of client devices 148. A set of remote server data may include information indicating device-specific facts corresponding to the respective client device. These device-specific facts may include a manufacturer of the client device, a model of the client device, an identity of an operating system executing on the client device, one or more applications executing on the client device, one or more other device-specific facts, or any combination thereof. In some examples, the device-specific facts in a set of remote server data may partially or completely overlap with a set of device-specific facts in one or more sets of access point data that correspond to the same client device. For example, a set of AP data stored in network data 354 may indicate that the respective client device is executing the MAC OS 11.08.02 operating system, and the client device is a 2020 model MacBook Pro, the client device is executing the Safari browser, or any combination thereof. A set of remote server data stored in network data 354 corresponding a client device may include some or all of the device-specific facts included in a set of AP data corresponding to the same client device. For example, the set of remote server data may indicate that the respective client device is executing the MAC OS 11.08.02 operating system, and the client device is a 2020 model MacBook Pro, the client device is executing the Safari browser, or any combination thereof.

Additionally, or alternatively, a set of remote server data may include one or more global IP addresses corresponding to the respective client device. A global IP address may identify the client device as being part of a respective LAN at one of sites 102, without identifying the respective client device as being separate from other devices within the LAN. That is, more than one device within the same LAN may correspond to the same global IP address. In some cases, every device within a LAN may correspond to the same global IP address. This means that the global IP address included in the remote server data may be different than local IP address(es) included in access point data, because the local IP addresses included in access point data identify a client device as being separate from other devices within a LAN, whereas the global IP addresses included in remote server data identify entire LANs without differentiating between devices within the same LAN. In some examples, a set of AP data and a set of remote server data may include some or all of the same device-specific facts such as the make and model of the client device, an operating system executing on the client device, and one or more applications executing on the client device.

Network data association engine 362 may be configured to determine that a set of remote server data stored in client device data 355 and a set of AP data stored in client device data 355 correspond to the same client device of client devices 148. For example, NMA 300 may receive a set of remote server data corresponding to client device 148A-1. In some examples, NMA 300 may receive the set of remote server data from an external server (e.g., one of servers 110,

116, 122, 124, 128). In some examples, NMA 300 may receive the set of remote server data from site 102A. The set of remote server data may correspond to a communication between client device 148A-1 and one of servers 110, 116, 122, 124, 128. For example, client device 148A-1 may send a data request to speed test server 124, the data request including a request to perform one or more speed tests. Speed test server may perform the one or more speed tests and send the results back to client device 148A-1. In some examples, speed test server 124 may send the set of remote server data to NMS 350 including information from the data request and the speed test results. In some examples, AP(s) 142A may send the set of remote server data to NMS 350 including information from the data request and the speed test results in response to speed test server 124 sending the speed test results back to site 102A. Network data association engine 362 may determine that the set of remote server data corresponds to client device 148A-1, and network data association engine 362 may identify one or more sets of access point data stored in client device data 355 that also correspond to client device 148A-1.

NMS 300 may receive one or more sets of access point data from APs 142 located at sites 102. In some examples, each of APs 142 may generate sequences of sets of access point data corresponding to each client device connected to the respective AP. For example, AP(s) 142A may generate a sequence of sets of access point data corresponding to each client device of client device 148A-1 through 148A-N. AP(s) 142A may generate a sequence of sets of access point data corresponding to client device 148A-1 at a predetermined rate so that the sequence of sets of access point data tracks characteristics of the connection between client device 148A-1 and AP 142A over a period of time. AP(s) 142A may send the sequence of sets of access point data to NMS 300 in real time as AP(s) 142A generates the sequence of sets of access point data. Consequently, NMS 300 may receive the sequence of sets of access point data as they are generated, allowing NMS 300 to track the connection between AP(s) 142A and client device 148A-1 in real time or near-real time.

Network data association engine 362 may identify, in response to receiving a set of remote server data corresponding to a client device, one or more sets of access point data corresponding to the same client device. As described above, the set of remote server data may include one or more device-specific facts corresponding to client device 148A-1. Sets of access point data may include device-specific facts that may partially or completely overlap with the device-specific facts included in sets of access point data. Consequently, network data association engine 362 may compare the sets of device-specific facts included in a set of remote server data with device-specific facts of sets of access point data stored in client device data 355. Based on comparing sets of device-specific facts included in a set of remote server data with device-specific facts included in sets of access point data stored in client device data 355, network data association engine 362 may determine that the set of remote server data corresponds to the same client device as one or more sets of access point data. Network data association engine 362 may "combine" the set of remote server data with one or more sets of access point data determined to correspond to the same client device so that client device data 355 associates information in the set of remote server data with information in the one or more sets of remote server data.

NMS 300 may include model engine 364. In some examples, Model engine 364 may generate one or more model(s) 356 based on network data 154. For example, client device data 155 may include a plurality of sets of access point data and a plurality of sets of remote server data. Client device data 155 may store one or more associations between sets of remote server data and sets of access point data. For example, the one or more associations may indicate that a respective set of AP data and a respective set of remote server data correspond to the same client device of client devices 148. In some examples, model engine 364 may generate a machine learning model based on associations between sets of access point data and sets of remote server data.

Figure 4:
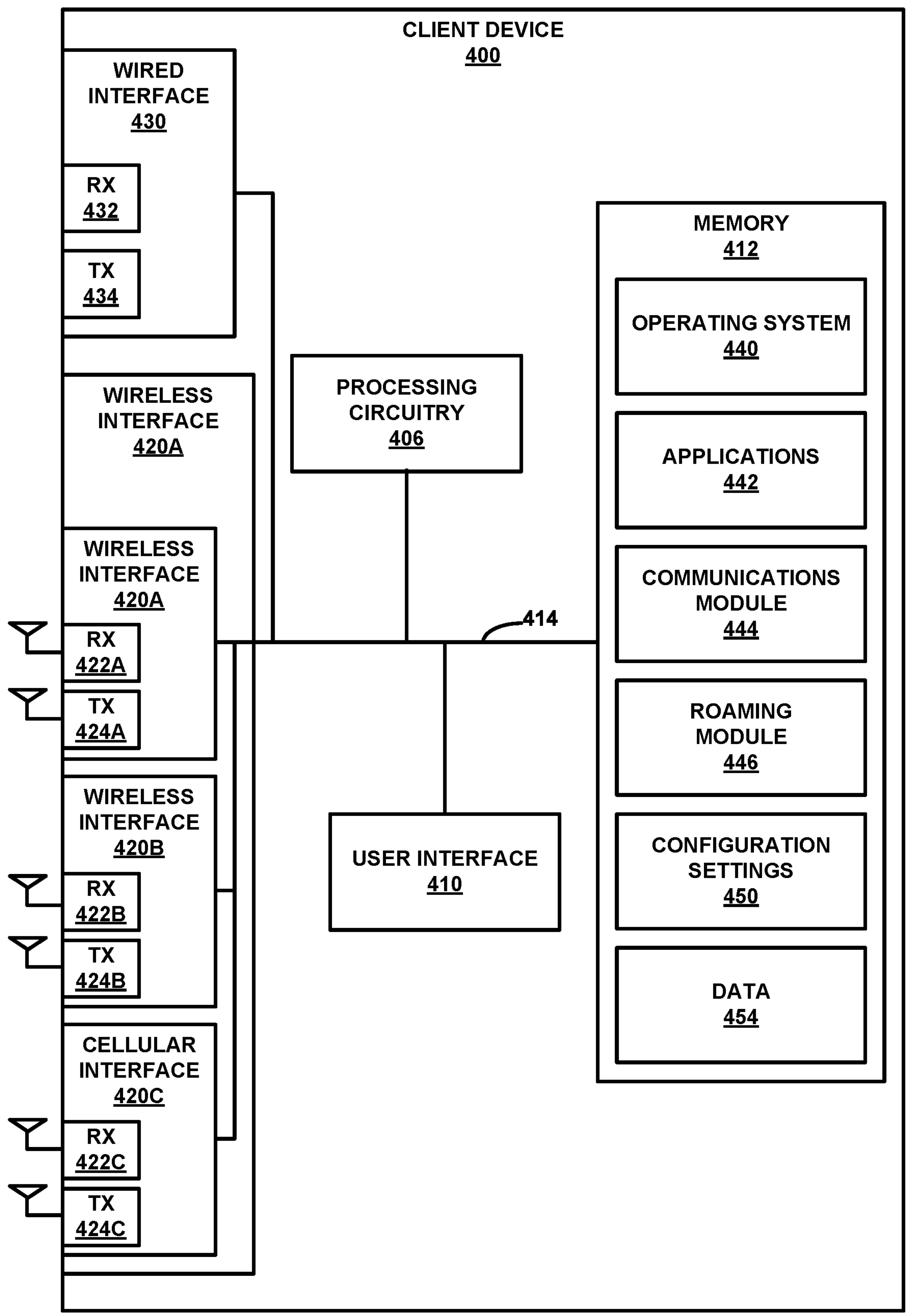
FIG. 4 is a block diagram illustrating an example client device, in accordance with one or more techniques of this disclosure.

FIG. 4 is a block diagram illustrating an example client device 400, in accordance with one or more techniques of this disclosure. Example client device 400 shown in FIG. 4 may be an example of any of client devices 148 of FIG. 1. Client device 400 may include any type of wireless client device, and the disclosure is not limited in this respect. For example, client device 400 may include a mobile device such as a smart phone, tablet or laptop computer, a personal digital assistant (PDA), a wireless terminal, a smart watch, a smart ring or any other type of mobile or wearable device. Client device 400 may also include any type of IoT client device such as a printer, a security sensor or device, an environmental sensor, or any other connected device configured to communicate over one or more wireless networks.

In accordance with one or more techniques of the disclosure, network data indicative of one or more aspects of the performance of a wireless network (that is, data used by NMS 150 to calculate one or more SLE metrics) is stored in memory 412 as network data 454 and transmitted to a network management system (e.g., NMS 140 of FIG. 1 and/or NMS 300 of FIG. 3) via one or more APs 142 in the wireless network. For example, NMS 150 receives network data from client devices 148 in sites 102 of FIG. 1. In some examples, NMS 150 receives relevant network data from client devices 148 on a continuous basis (e.g., every 2 seconds or other appropriate time period), and NMS may calculate one or more SLE metrics for each client device on a periodic basis as defined by a first predetermined period of time (e.g., every 10 minutes or other predetermined time period).

The network data 454 may include, for example, RSSI measurements of one or more wireless signals received from one or more AP devices by client device 400 as measured by client device 400. The network data may further include a log of one or more client device associated events or states such as one or more roaming association events, re-association events, roam away events, disassociation events, association failure events, and any other data or event relevant for determination of one or more roaming quality assessments and/or other SLE metrics. Some of the specific messages associated with the roaming are 802.11 FT Auth Req, 802.11 FT Auth response, Re-association Req, Re-association Req Response, Action frame FT Req, FT frame Response, etc. Additionally, or alternatively, the network data 454 may include information that is part of one or more sets of access point data and/or one or more sets of remote server data stored in client device data 155 of the NMS 150 of FIG. 1.

Client device 400 includes a wired interface 430, wireless interfaces 420A-420C, processing circuitry 406, memory 412 and a user interface 410. The various elements are coupled together via a bus 414 over which the various elements may exchange data and information. Wired interface 430 includes a receiver 432 and a transmitter 434. Wired interface 430 may be used, if desired, to couple client device 400 to network(s) 134 of FIG. 1. First, second and third wireless interfaces 420A, 420B, and 420C include receivers 422A, 422B, and 422C, respectively, each including a receive antenna via which client device 400 may receive wireless signals from wireless communications devices, such as APs 142 of FIG. 1, AP 200 of FIG. 2, other client devices 148, or other devices configured for wireless communication. First, second, and third wireless interfaces 420A, 420B, and 420C further include transmitters 424A, 424B, and 424C, respectively, each including transmit antennas via which client device 400 may transmit wireless signals to wireless communications devices, such as APs 142 of FIG. 1, AP 200 of FIG. 2, other client devices 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which client device 400 may connect to a cellular network.

Processing circuitry 406 executes software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the processing circuitry 406 to perform the techniques described herein.

Memory 412 includes one or more devices configured to store programming modules and/or data associated with operation of user 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the processing circuitry 406 to perform the techniques described herein.

In this example, memory 412 includes an operating system 440, applications 442, a communications module 444, configuration settings 450, and data storage 454. Data storage 454 may include, for example, a status/error log including network data specific to client device 400. As described above, data 454 may include any network data, events, and/or states that may be related to determination of one or more roaming quality assessments. The network data may include event data such as a log of normal events and error events according to a logging level based on instructions from the network management system (e.g., NMS 150/300). Data storage 454 may store any data used and/or generated by client device 400, such as network data used to calculate one or more SLE metrics, that is collected by client device 400 and transmitted to any of APs 138 in a wireless network 106 for further transmission to NMS 150.

Communications module 444 includes program code that, when executed by processing circuitry 406, enables client device 400 to communicate using any of wired interface(s) 430, wireless interfaces 420A-420B and/or cellular interface 450C. Configuration settings 450 include any device settings for client device 400 settings for each of wireless interface(s) 420A-420B and/or cellular interface 420C. Roaming module 446 includes program code that, when executed by processing circuitry 406, enable client device 400 to perform one or more roaming operations in a wireless network 106. For example, roaming module 446 includes program code that, when executed by processing circuitry 406, enable client device 400 to, in response to determining that a measured roaming parameter(s) (such as an RSSI of a wireless signal received from a current AP, a number of failed connection attempts, etc.) is below a configured roaming threshold, seek for potential roaming candidates among other APs 148 in the wireless network 106. As another example, roaming module 446 includes program code that, when executed by processing circuitry 406, enable client device 400 to, in response to receipt of a disassociation message from a current AP, seek for potential roaming candidates among other APs 148 in the wireless network 106.

Figure 5:
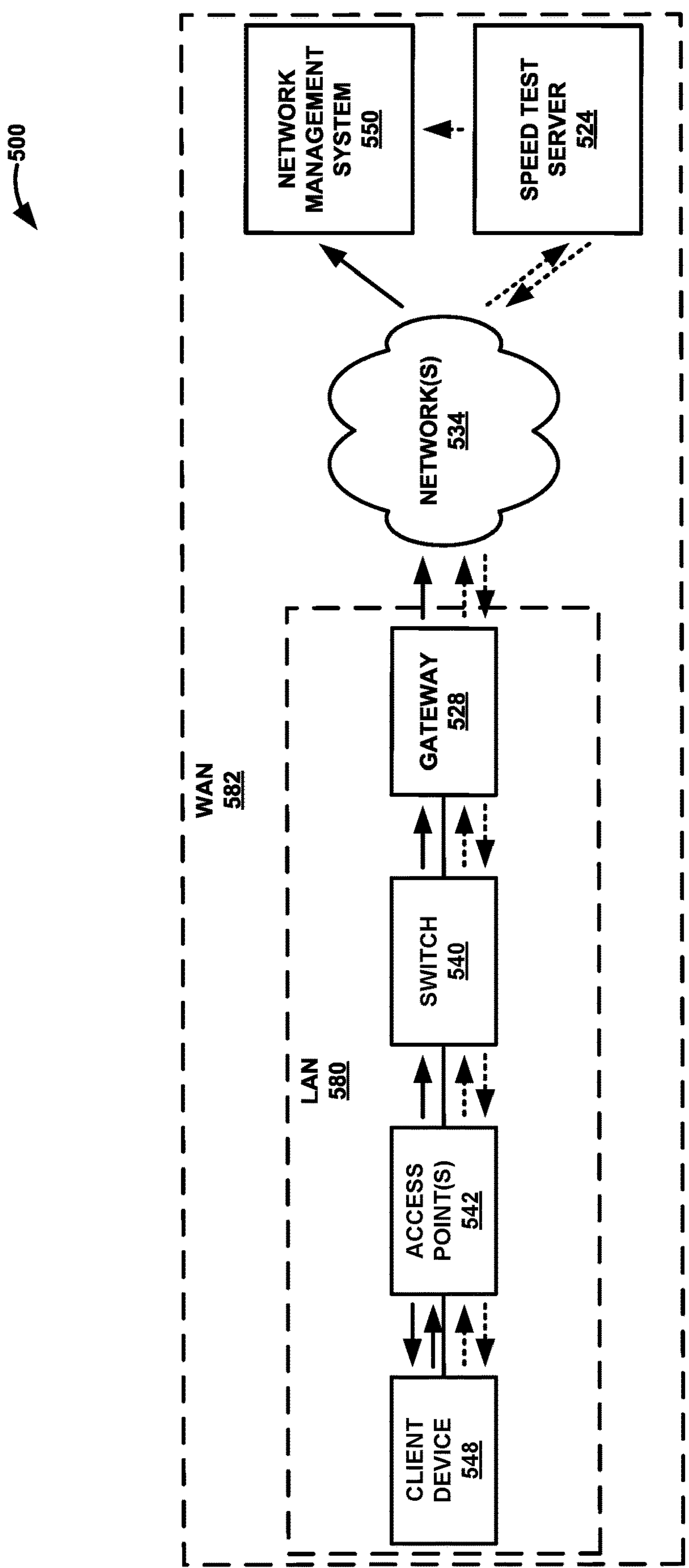
FIG. 5 is a block diagram illustrating a communication between an example client device and a network management system, and a communication between the example client device and a speed test server within a network system, in accordance with one or more techniques of the disclosure.

FIG. 5 is a block diagram illustrating a communication between an example client device 548 and a network management system 550, and a communication between the example client device 548 and a speed test server 524 within a network system 500, in accordance with one or more techniques of the disclosure. As seen in FIG. 5, system 500 includes speed test server 524, gateway 528, switch 540, AP(s) 542, client device 548, and network management system 550. System 500 may include one or more components of network system 100 of FIG. 1. For example, speed test server 524 may be an example of speed test server 122 of FIG. 1. Network(s) 534 may be an example of network(s) 134 of FIG. 1. Switch 540 may be an example of switch 140 of FIG. 1. AP(s) 542 may be an example of AP(s) 142. Client device 548 may be an example of any of client devices 148 of FIG. 1 (e.g., client device 148A-1). Network management system 550 may be an example of network management system 150 of FIG. 1.

In some examples, client device 548 may connect to AP(s) 542. In some examples, client device 548 may form a wireless connection with AP(s) 542. In some examples, client device 548 may form a wired connection with AP(s) 542. By connecting to AP(s) 542, client device 548 may join LAN 580 which includes a group of devices at a site (e.g., site 102A of FIG. 1). For example, LAN 580 includes client device 548, AP(s) 542, and switch 540. In some examples, devices within LAN 580 may be located in the same general geographic area (e.g., in the same building, campus, or group of buildings). LAN 580 may, in some examples, include one or more additional client devices that connect to AP(s) 542.

When client device 548 connects to AP(s) 542, AP(s) 542 and client device 548 may exchange one or more sets of access point data. AP(s) 542 may send sets of access point data corresponding to client device 548 to network management system 550 on a continuous basis (e.g., every one second, every two seconds, or other appropriate time period). In some examples, a set of AP data corresponding to client device 548 may include one or more local IP addresses that identify the client device 548 within LAN 580. For example, the one or more local IP addresses may distinguish the client device as 548 being separate from other devices within the same wireless network (e.g., identifies client device 548 as being separate from AP(s) 542, switch 540, and one or more other client devices connected to switch 540 and/or AP(s) 542). The one or more local IP addresses may include one or more MAC addresses, one or more LAN IP addresses, and/or one or more other IP addresses that identify the client device 548 as a device that is separate from other devices within LAN 580. Since each set of AP data corresponding to client device 548 that AP(s) 542 send to NMS 550 includes the one or more local IP addresses, NMS 550 may be configured to identify sets of access point data as corresponding to the client device 548.

A set of AP data corresponding to client device 548 may include information that indicates one or more SLE metrics corresponding to the connection between client device 548 and AP(s) 542. This information may include RSSI data, SNR data, and/or any other data that indicates characteristics of an interaction between the client device 548 and the LAN 580. NMS 550 may calculate one or more SLE metrics based on the one or more sets of access point data.

In some examples, a set of AP data corresponding to client device 548 may include information indicative of device-specific facts. As described herein, "device-specific facts" may include characteristics of a client device such as a manufacturer of the client device, a model of the client device, an identity of an operating system executing on the client device, one or more applications executing on the client device, and/or other information concerning characteristics of the respective client device. IP addresses are separate from device-specific facts because IP addresses identify the existence of the device, whereas device-specific facts indicate characteristics of the device. Additionally, or alternatively, a set of AP data corresponding to client device 548 may include one or more global IP addresses. As described herein, a "global IP address" identifies devices within a LAN 580 without differentiating between devices within the same LAN. For example, a global IP address might be the same for every device within LAN 580. Each set of AP data of the one or more sets of access point data corresponding to client device 548 may include a time stamp corresponding to a time at which the set of AP data is generated. Each set of AP data of the one or more sets of access point data corresponding to client device 548 may include a "browser fingerprint." This browser fingerprint may include some or all of the one or more device-specific facts corresponding to the client device 548.

Client device 548 may be configured to communicate with one or more remote servers that are outside of LAN 580. For example, client device 548 may be configured to send a data request to speed test server 524 via AP(s) 542, switch 540, network(s) 534, and gateway 528. In some examples, client device 548 may send the data request to speed test server 524 in response to a user input to client device 548, or to an administrator input to network management system 555. This input may cause the client device 548 to enter a URL into a web browser. The data request may, in some examples, include a time stamp indicating at time at which client device 548 sends the data request. In some examples, the data request may include a global IP address indicating that client device 548 is located within LAN 580, but the global IP address might not differentiate client device 548 from other devices within LAN 580. In some examples, the data request may include a browser fingerprint. This browser fingerprint may include some or all of the one or more device-specific facts corresponding to the client device 548. In some examples, the browser fingerprint is part of the URL entered in response to the user input.

In response to receiving the data request from client device 548, speed test server 524 may perform one or more speed tests corresponding to client device 548. A set of remote server data corresponding to client device 548 may include a time stamp for the data request, a global IP address corresponding to LAN 580, the one or more device-specific facts corresponding to client device 548, and the results of the one or more speed tests performed by speed test server 524. In some examples, speed test server 524 sends the set of remote server data including the speed test results back to client device 582. In some examples, speed test server 524 sends the set of remote server data corresponding to the client device 548 to NMS 550. In some examples, AP(s) 542 send the set of remote server data including the speed test results to NMS 550 in response to receiving set of remote server data including the speed test results from speed test server 524. The following table includes an example composition of a set of AP data corresponding to client device 548 and a set of remote server data corresponding to client device 548.

TABLE 1

| SET OF AP DATA | SET OF REMOTE SERVER DATA |
|---|---|
| Time stamp corresponding to communication with AP | Time stamp corresponding to communication with remote server |
| Global IP address | Global IP address |
| Browser Fingerprint | Browser Fingerprint |
| LAN IP address | |
| MAC Address | |
| LAN client data indicating one or more SLE metrics for the client device within the LAN (e.g., RSSI, SNR, Ping) | Speed test results |

As seen above in Table 1, the set of AP data and the set of remote server data overlap somewhat (both of the set of AP data and the set of remote server data include the Global IP address and device-specific facts). The set of AP data includes some information (e.g., the LAN IP address, the MAC address, and the data indicating one or more SLE metrics) that is not present in the set of remote server data. The set of remote server data includes information (e.g., speed test results) that is not present in the set of AP data. It may be beneficial for NMS 550 to determine that the set of AP data and the set of remote server data both correspond to the same client device 548, so that NMS 550 can take one or more actions based on both sets of data, such as to obtain end-to-end performance results, to identify a suitable AP for a client device to connect to, to determine whether to move a client device to a different AP, to train one or more models that evaluate speed test results in view of access point data, or other action.

In some examples, NMS 550 is configured to receive a plurality of sets of AP data corresponding to a plurality of client devices. For example, NMS 550 may receive a set of AP data corresponding to a communication between client device 548 and access point(s) 542. The set of AP data may include, as seen in Table 1, an access point data time stamp, a global IP address, a browser fingerprint, a LAN IP address, a MAC address, and SLE metric data. In some examples, the set of AP data corresponding to the communication between client device 548 and access point(s) 542 includes a plurality of AP data samples, each data sample of the plurality of AP data samples corresponding to a point in time. That is, AP(s) 542 and client device 548 may consistently poll AP data samples at a polling rate (e.g., every second, every two seconds, or any other interval of time) so that the set of AP data corresponding to client device 548 reflects current SLE metrics. Each AP data sample of the plurality of data samples may correspond to a respective AP data time stamp.

In some examples, NMS 550 may receive a set of remote server data, wherein the set of remote server data comprises information corresponding to a communication between client device 548 and an external server (e.g., speed test server 524) separate from the network management system 550. In some examples, NMS 550 may receive the set of remote server data in response to the speed test server 524 receiving a data request from the client device 548. The set of remote server data may, in some examples, include a remote server data time stamp, a global IP address, a browser fingerprint, and speed test data. In some examples, speed test server 524 is configured to receive, from client device 548, a data request. The data request may, in some cases, represent an HTTP request including a browser fingerprint, a global IP address corresponding to client device 548, and a time stamp. In response to receiving the data request, the speed test server 524 may perform one or more speed tests to generate speed test results, wherein the speed test results indicate an amount of bandwidth available to client device 524. Speed test server 524 may output the set of remote server data including the remote server data time stamp, the global IP address, the browser fingerprint, and the speed test data. In some examples, speed test server 524 may output the set of remote server data directly to NMS 550. In some examples, speed test server 524 may output the set of remote server data to access point(s) 542, and access point(s) 542 may output the set of remote server data to NMS 550.

NMS 550 may store an association between a set of AP data of the plurality of sets of AP data and the set of remote server data, wherein the association indicates that the set of AP data and the set of remote server data correspond to the same client device 548, and wherein the set of AP data comprises at least some information inaccessible to the speed test server 524 communicating with the client device 548. In some examples, the set of remote server data may include at least some information that is unavailable to the APs 542.

In some examples, to identify the association, NMS 550 may determine that the set of AP data and the set of remote server data correspond to the same client device 548. In some examples, NMS 550 may compare the browser fingerprint of the set of AP data with the browser fingerprint of the set of remote server data in order to determine that the set of AP data and the set of remote server data correspond to the same user device 548. For example, the browser fingerprint data included in the set of AP data and/or the set of remote server data may include a browser version executing on the user device 548, a device type of user device 548 an operating system version executing on the user device 548, a manufacturer of the user device 548, a make of the user device 548, a model of the user device 548, a time zone in which the user device 548 is operating, HTTP data corresponding to the user device 548, or any combination thereof. Based on determining that one or more components of the browser fingerprint data of the set of AP data match one or more components of the browser fingerprint data of the set of remote server data, NMS 550 may determine that the set of browser fingerprint data and the set of AP data correspond to the same client device 548.

In some examples, NMS 550 may compare the browser fingerprint of the set of AP data with the browser fingerprint of the set of remote server data and compare the one or more global IP addresses of the set of AP data with the one or more global IP addresses of the set of remote server data. Based on NMS 550 identifying one or more matches between the global IP addresses and the browser fingerprints, NMS 550 may determine that the set of browser fingerprint data and the set of AP data correspond to the same client device 548.

The set of AP data and the set of remote server data may include local port data. For example, user device 548 may be associated with a "local port" on the access point(s) 542. When user device 548 communicates with access point(s) 542, the access point(s) 542 may include local port data in each access point data sample that identifies the local port connected to user device 548. In some examples, when user device 548 communicates with speed test server 524, user device 548 may include local port data in the browser data that is part of the data request. This means that both of the set of access point data and the set of remote server data may include local port data indicating the same local port. This may allow NMS 550 to determine that the set of access point data and the set of remote server data correspond to the same user device 548. NMS 550 may also compare time stamps in the set of access point data and the set of remote server data.

Comparing browser fingerprint data alone may allow NMS 550 to match a set of remote server data with a particular user device. Comparing browser fingerprint data and global IP address data may improve an accuracy of matching remote server data with access point data as compared with using browser fingerprint data alone. In some examples, comparing timestamp data and speed test data may improve an accuracy of matching remote server data with access point data as compared with using browser fingerprint data and access point data.

In some examples, NMS 550 may be configured to train one or more models based on stored associations between access point data and remote device data. For example, NMS 550 may use associations between speed test data and SLE data in order to estimate a throughput of one or more user devices. Inputs to the throughput model may include client-level Wi-Fi data including client RSSI data, client SNR data, client Wi-Fi protocol data, a number of Wi-Fi streams, channel bandwidth, and device type (e.g., mobile, computer). Additionally, or alternatively, inputs to the throughput model may include AP level Wi-Fi data such as a most recent round trip time (RTT) of a ping to the AP, a number of clients currently connected to the AP, AP-specific data transmission (TX/RX) in a most recent period of time, an AP model, channel utilization and interference, antennae transmission power, and CPU and memory usage. In some examples, inputs to the throughput model may include data corresponding to one or more wired connections upstream of the AP such as an estimate for site WAN uplink (e.g., a 100 Megabits per second (Mbps) cable connection), a number of clients registered at a site, and a site-wide data transmission (TX/RX) in the most recent period of time. In some examples, inputs to the throughput model may include a time of day or a day of the week. In some examples, it may be beneficial to link data from an external server with LAN data associated with a connection between a user device and an access point (e.g., SLE metric data). In some examples, NMS 550 may use speed test data will be used to train a machine-learning model that predicts client network performance in real-time.

In some examples, to determine a best AP of AP(s) 542 for a client to associate with, NMS 550 may determine a predicted network performance. For example, NMS 550 may determine that client device 548 has 100 Mbps of throughput when using a first AP, but only 75 Mbps when using a second AP. In some examples, APs may refuse connections in order to incentivize client devices to associate elsewhere.

Figure 6:
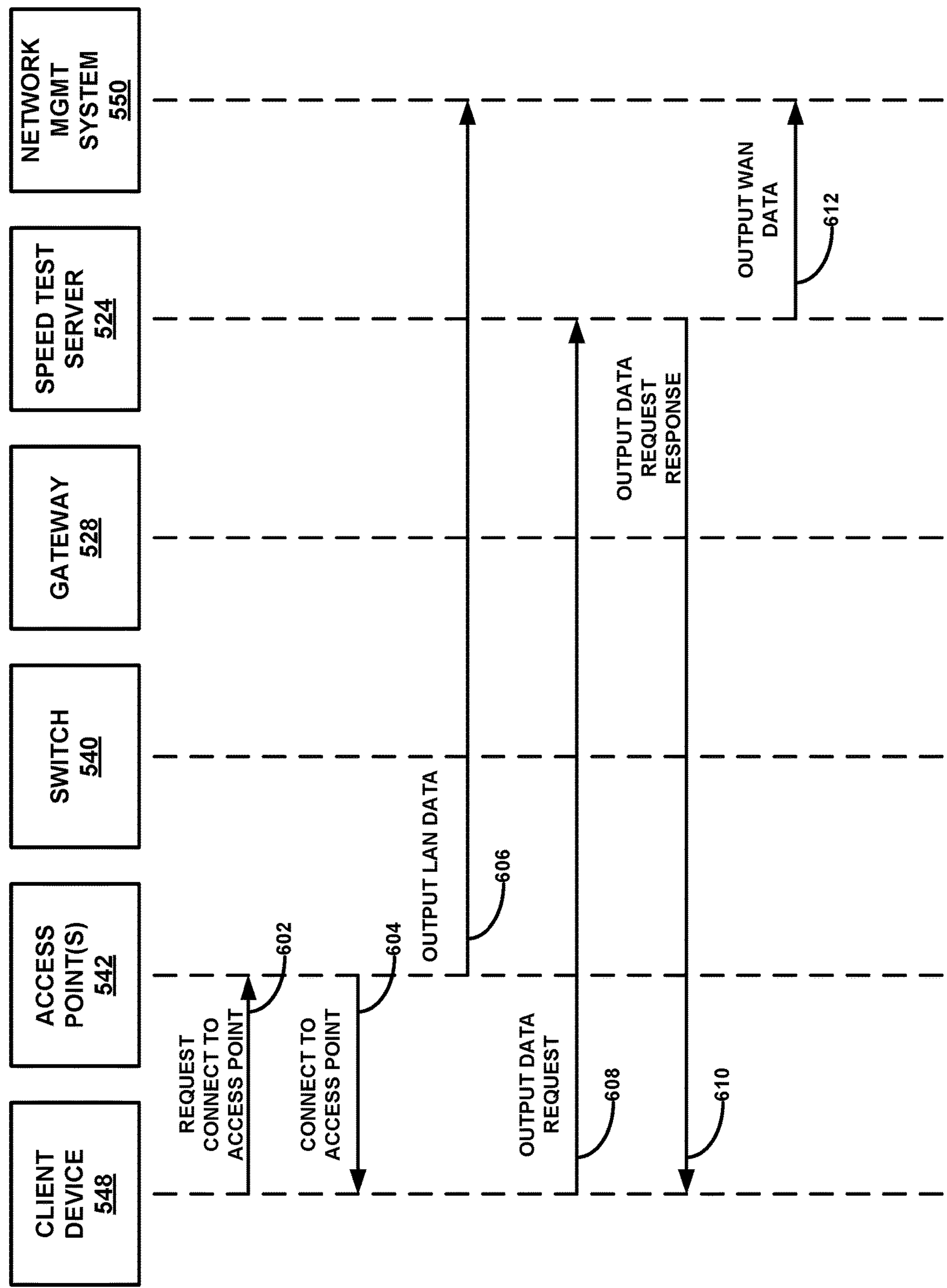
FIG. 6 is a flow diagram illustrating an example operation for associating a set of AP data and a set of remote server data, in accordance with one or more techniques of this disclosure.

FIG. 6 is a flow diagram illustrating an example operation for associating a set of AP data and a set of remote server data, in accordance with one or more techniques of this disclosure. For convenience, FIG. 6 is described with respect to client device 548, AP 542, switch 540, gateway 528, speed test server 524, and NMS 550 of FIG. 5. However, the techniques of FIG. 6 may be performed by different components of client device 548, AP 542, switch 540, gateway 528, speed test server 524, and NMS 550 or by additional or alternative devices.

Client device 548 may send a request to connect to an AP of AP(s) 542 (602). AP(s) 542 may send a response to the request, thus connecting client device 548 to AP(s) 542 (604). In some examples, this response/request may cause AP(s) 542 to generate a set of AP data corresponding to client device 548. This set of AP data may include a timestamp, a global IP address corresponding to LAN 580, device-specific facts corresponding to client device 548, a LAN IP address corresponding to client device 548, a MAC address corresponding to client device 548, and data indicating one or more SLE metrics. AP(s) 542 may output the set of AP data to NMS 550.

Client device 548 may output a data request to speed test server 524. In some examples, the data request may include a request to perform one or more speed tests. Speed test server 524 may perform one or more speed tests in response to receiving the data request. Speed test server 524 may output a response to client device 548 that includes results to the one or more speed tests (610). In some examples, speed test server 524 may output a set of remote server data to NMS 550 (612). The set of remote server data may include a timestamp corresponding to the data request, a global IP address corresponding to LAN 580, device-specific facts corresponding to client device 548, and speed test results. NMS 550 may determine, based on information included in the set of AP data and information included in the set of remote server data, that the set of AP data and the set of remote server data correspond to the same client device 548.

Figure 7:
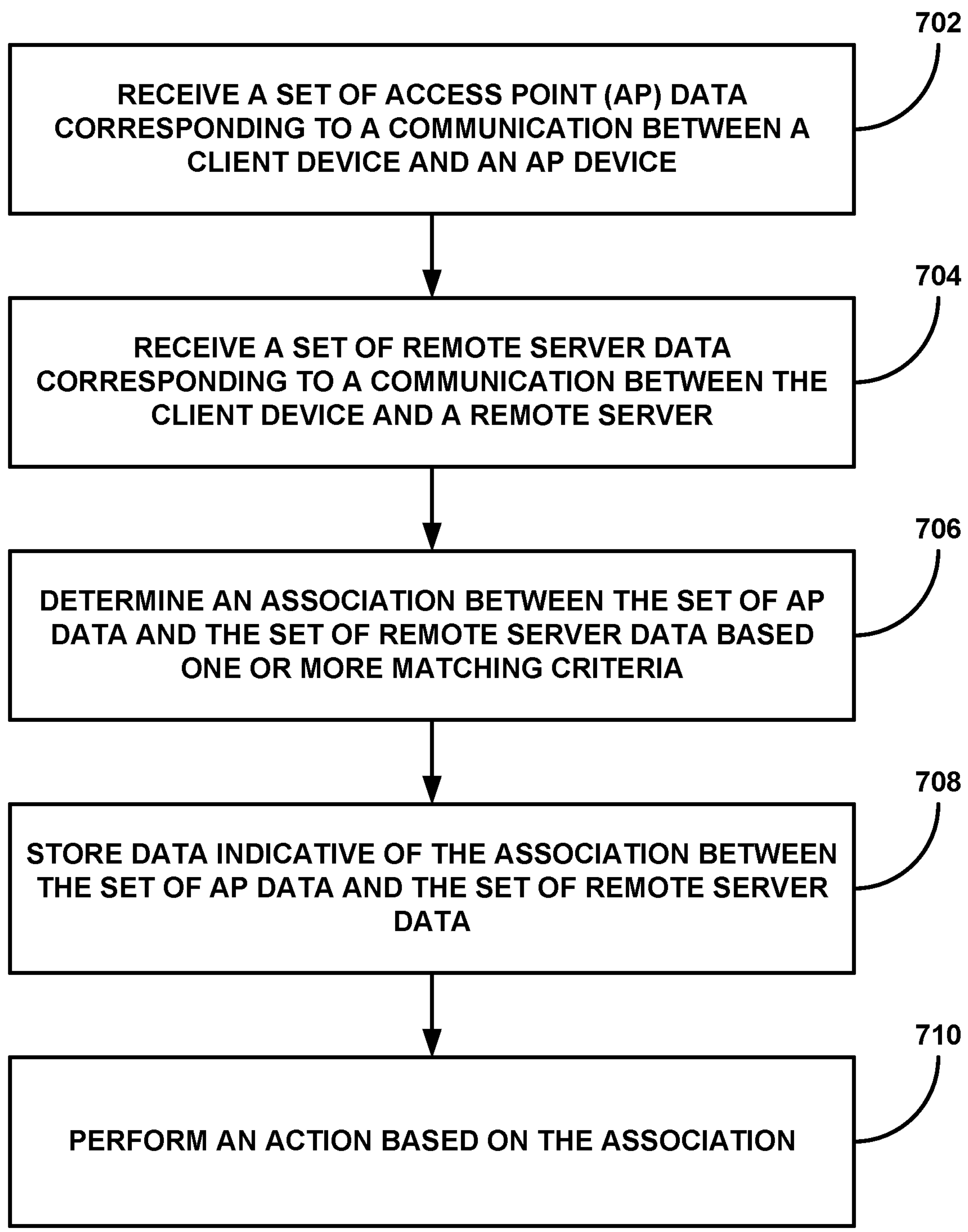
FIG. 7 is a flow diagram illustrating an example operation for storing an association between a set of AP data and a set of remote server data, in accordance with one or more techniques of this disclosure.

FIG. 7 is a flow diagram illustrating an example operation for storing an association between a set of AP data and a set of remote server data, in accordance with one or more techniques of this disclosure. For convenience, FIG. 6 is described with respect to client device 548, AP 542, switch 540, gateway 528, speed test server 524, and NMS 550 of FIG. 5. However, the techniques of FIG. 6 may be performed by different components of client device 548, AP 542, switch 540, gateway 528, speed test server 524, and NMS 550 or by additional or alternative devices.

NMS 550 is configured to receive a set of access point (AP) data corresponding to a communication between a client device 548 and access point(s) 542. In some examples, NMS 550 receives the set of AP data from access point(s) 542. The set of AP data may, in some examples, include a timestamp, a browser fingerprint, one or more global IP address, one or more local IP addresses, and SLE metric data. NMS 550 is configured to receive a set of remote server data corresponding to a communication between the client device and a remote server (704). In some examples, NMS 550 receives the set of remote server data from the speed test server 524. The set of AP data may, in some examples, include a timestamp, one or more global IP addresses, a browser fingerprint, and speed test results.

NMS 550 is configured to determine an association between the set of AP data and the set of remote server data based on one or more matching criteria (706). In some examples, NMS 550 identifies a browser fingerprint matching criterion by determining one or more matches between the browser fingerprint in the set of AP data and the browser fingerprint in the set of remote server data. In some examples, NMS 550 identifies a global IP address matching criterion by determining one or more matches between a global IP address in the set of AP data in the browser fingerprint and a global IP address in the set of remote server data. In some examples, the one or more matching criteria indicate that both of the set of AP data and the set of remote server data both correspond to the same client device 548.

NMS 550 is configured to store data indicative of the association between the set of AP data and the set of remote server data (708). NMS 550 is configured to perform an action based on the association (710). In some examples, to perform the action, NMS 550 is configured to generate a model based on the association between the set of AP data and the set of remote server data, wherein the model is configured to reflect one or more relationships between the set of AP data and the set of remote server data.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network management system comprising:

memory; and processing circuitry having access to the memory, the processing circuitry configured to:

receive a set of access point (AP) data corresponding to a client device of a plurality of client devices, wherein the set of AP data comprises data associated with a communication between the client device and an AP device;

receive a set of remote server data, wherein the set of remote server data comprises information corresponding to a communication between the client device and a remote server separate from the network management system;

determine an association between the set of AP data and the set of remote server data based on one or more matching criteria;

store data indicative of the association between the set of AP data and the set of remote server data, wherein the one or more matching criteria indicate that the set of AP data and the set of remote server data correspond to the same client device of the plurality of client devices, and wherein the set of AP data comprises at least some information inaccessible to the remote server communicating with the client device; and perform an action based on the association.

2. The network management system of claim 1, wherein the one or more matching criteria comprises any one or combination of: browser fingerprint data, global internet protocol (IP) address data, or local port identification data.

3. The network management system of claim 2, wherein the one or more matching criteria comprise the browser fingerprint data, and wherein to determine the association, the processing circuitry is configured to:

identify first browser fingerprint data in the set of AP data;

identify second browser fingerprint data in the remote server data; and compare the first browser fingerprint data and the second browser fingerprint data to identify a browser fingerprint matching criterion of the one or more matching criteria that indicates that the set of AP data and the set of remote server data correspond to the same client device.

4. The network management system of claim 2, wherein the one or more matching criteria further comprise the global IP address data, and wherein to determine the association, the processing circuitry is further configured to:

identify a first global IP address in the set of AP data;

identify a second global IP address in the set of remote server data; and compare the first global IP address and the second global IP address to identify a global IP address matching criterion of the one or more matching criteria that indicates that the set of AP data and the set of remote server data correspond to the same client device.

5. The network management system of claim 2, wherein the one or more matching criteria comprise the local port identification data, and wherein to determine the association, the processing circuitry is further configured to:

identify first local port information in the set of AP data;

identify second local port information in the remote server data; and compare the first local port information and the second local port information in order to identify a local port matching criterion of the one or more matching criteria that indicates that the set of AP data and the set of remote server data correspond to the same client device.

6. The network management system of claim 1, wherein the set of AP data comprises service level expectations (SLE) data indicating one or more SLE metrics corresponding to the communication between the client device and an AP device, wherein the set of remote server data comprises speed test results, and wherein to store data indicative of the association between the set of AP data and the set of remote server data, the processing circuitry is configured to store data indicative of an association between the SLE data and the speed test results.

7. The network management system of claim 6, wherein the SLE data comprises received signal strength indicator (RSSI) data, signal-to-noise ratio (SNR) data, and ping data.

8. The network management system of claim 1, wherein the client device of the plurality of client devices is connected to the AP device, wherein the set of AP data corresponds to a connection between the client device and the AP device, and wherein the processing circuitry is configured to:

receive, from the AP device, the set of AP data;

determine, based a local IP address in the set of AP data, that the client device of the plurality of client devices corresponds to the set of AP data; and store the set of AP data, the set of remote server data, and the data indicative of the association in the memory, wherein the data indicative of the association indicates that the set of AP data and the set of remote server data correspond to the client device.

9. The network management system of claim 8, wherein the local IP address identifies the client device as being separate from the AP device and separate from each other client device of the plurality of client devices.

10. The network management system of claim 9, wherein the set of remote server data and the set of AP data include a global IP address that is the same for each client device of the plurality of devices and the AP device.

11. The network management system of claim 1, wherein the processing circuitry is configured to receive the set of remote server data in response to the client device initiating the communication between the client device and the remote server by sending a data request to the remote server.

12. The network management system of claim 11, wherein the remote server is configured to:

receive, from the client device, the data request;

perform one or more speed tests to generate speed test results indicating an amount of bandwidth available to the client device; and output the set of remote server data, wherein the set of remote server data comprises the speed test results.

13. The network management system of claim 1, wherein the set of AP data comprises a plurality of AP data samples, each AP data sample of the plurality of AP data samples corresponds to a data sampling time period, and wherein the processing circuitry is configured to:

identify an AP data time sample of the plurality of AP data samples corresponding to data sampling time period that is closest to a data sampling time period of the set of remote server data; and wherein to store the association between the set of AP data and the set of remote server data, the processing circuitry is configured to store an association between the AP data sample of the plurality of AP data samples and the set of remote server data.

14. The network management system of claim 1, wherein to perform the action, the processing circuitry is configured to generate a model based on the association between the set of AP data and the set of remote server data, wherein the model is configured to reflect one or more relationships between the set of AP data and the set of remote server data.

15. A method comprising:

receiving, by processing circuitry of a network management system, a set of access point (AP) data corresponding to a client device of a plurality of client devices, wherein the set of AP data corresponds to a communication between the client device and an AP device;

receiving, by the processing circuitry, a set of remote server data, wherein the set of remote server data comprises information corresponding to a communication between the client device and a remote server separate from the network management system;

determining, by the processing circuitry, an association between the set of AP data and the set of remote server data based on one or more matching criteria;

storing, by the processing circuitry, data indicative of the association between the set of AP data and the set of remote server data, wherein the one or more matching criteria indicate that the set of AP data and the set of remote server data correspond to the same client device of the plurality of client devices, and wherein the set of AP data comprises at least some information inaccessible to the remote server communicating with the client device; and performing, by the processing circuitry, an action based on the association.

16. The method of claim 15, wherein the one or more matching criteria comprises any one or combination of: browser fingerprint data, global internet protocol (IP) address data, or local port identification data.

17. The method of claim 16, wherein the one or more matching criteria comprise the browser fingerprint data, and wherein determining the association comprises:

identifying first browser fingerprint data in the set of AP data;

identifying second browser fingerprint data in the remote server data; and comparing the first browser fingerprint data and the second browser fingerprint data to identify a browser fingerprint matching criterion of the one or more matching criteria that indicates that the set of AP data and the set of remote server data correspond to the same client device.

18. The method of claim 16, wherein the one or more matching criteria further comprise the global IP address data, and wherein determining the association comprises:

identifying a first global IP address in the set of AP data;

identifying a second global IP address in the set of remote server data; and comparing the first global IP address and the second global IP address to identify a global IP address matching criterion of the one or more matching criteria that indicates that the set of AP data and the set of remote server data correspond to the same client device.

19. The method of claim 16, wherein the one or more matching criteria comprise the local port identification data, and wherein determining the association comprises:

identifying first local port information in the set of AP data;

identifying second local port information in the remote server data; and comparing the first local port information and the second local port information in order to identify a local port matching criterion of the one or more matching criteria that indicates that the set of AP data and the set of remote server data correspond to the same client device.

20. Non-transitory computer-readable media comprising instructions for causing one or more processors to:

receive a set of access point (AP) data corresponding to a client device of a plurality of client devices, wherein the set of AP data corresponds to a communication between the client device and an AP device;

receive a set of remote server data, wherein the set of remote server data comprises information corresponding to a communication between the client device and a remote server;

determine an association between the set of AP data and the set of remote server data based on one or more matching criteria;

store data indicative of the association between the set of AP data and the set of remote server data, wherein the one or more matching criteria indicate that the set of AP data and the set of remote server data correspond to the same client device of the plurality of client devices, and wherein the set of AP data comprises at least some information inaccessible to the remote server communicating with the client device; and perform an action based on the association.

* * * * *